US012800325B2

(12) United States Patent
Beaurepaire et al.

(10) Patent No.: US 12,800,325 B2
(45) Date of Patent: Nov. 17, 2026

(54) SYSTEMS AND METHODS FOR CHARGING OF VEHICLES BASED ON MOBILITY GRAPHS OF USERS

(71) Applicant: HERE GLOBAL B.V., Eindhoven (NL)

(72) Inventors: Jerome Beaurepaire, Nantes (FR); Jeremy Michael Young, Beverly Hills, MI (US)

(73) Assignee: HERE GLOBAL B.V., Eindhoven (NL)

( * ) Notice: Subject to any disclaimer, the term of this patent is extended or adjusted under 35 U.S.C. 154(b) by 14 days.

(21) Appl. No.: 18/989,295

(22) Filed: Dec. 20, 2024

(65) Prior Publication Data

US 2026/0177392 A1 Jun. 25, 2026

(51) Int. Cl.
*G01C 21/34* (2006.01)
*B60W 60/00* (2020.01)

(52) U.S. Cl.
CPC ..... *G01C 21/3476* (2013.01); *B60W 60/0023* (2020.02); *G01C 21/3469* (2013.01)

(58) Field of Classification Search
CPC ........... G01C 21/3476; G01C 21/3469; B60W 60/0023
See application file for complete search history.

(56) References Cited

U.S. PATENT DOCUMENTS 11,002,557 B2 * 5/2021 Pedersen ............ G01C 21/3492
12,005,929 B2 * 6/2024 Park ...................... B60L 53/665
12,229,693 B2 * 2/2025 Maeda .................... B60L 53/67
12,400,495 B2 * 8/2025 Sharma ................ G07C 5/0825
2015/0091531 A1 * 4/2015 Hyde .................. G06Q 10/105 320/137
2017/0313321 A1 * 11/2017 Asakura ............ G01C 21/3476
(Continued)

FOREIGN PATENT DOCUMENTS

| | | | |
|---|---|---|---|
| EP | 2323866 | A2 | 5/2011 |
| KR | 102214905 | B1 | 2/2021 |
| WO | 2010033517 | A2 | 3/2010 |

OTHER PUBLICATIONS

Morris, "Evmatch: A Simple, Low-cost Way to Monetize Your Charging Stations", Retrieved on Nov. 27, 2024, Webpage available at https://chargedevs.com/features/evmatch-a-simple-low-cost-way-to-monetize-your-charging-stations/.
(Continued)

*Primary Examiner* — Ashley L Redhead, Jr.
(74) *Attorney, Agent, or Firm* — Michael Yu; HERE GLOBAL B.V.

(57) ABSTRACT

A system for automated charging of electric vehicles obtains a first route between a source and a destination of the vehicle and computes charging data for the vehicle based on the first route. The system determines one or more private charging stations along the first route, each private charging station being associated with a respective host user. Using one or more constraints associated with each private charging station, the charging data, and a host mobility graph of the host user of each private charging station, the system filters the one or more private charging stations. The system further generates navigation recommendation data for the vehicle, based on the first route and the result of the filtration and outputs the navigation recommendation data.

20 Claims, 19 Drawing Sheets

(56) References Cited

U.S. PATENT DOCUMENTS

| | | | | |
|---|---|---|---|---|
| 2020/0070664 | A1* | 3/2020 | In | F03D 9/32 |
| 2023/0264582 | A1 | 8/2023 | Maeda et al. | |
| 2024/0140217 | A1* | 5/2024 | Ropel | B60L 58/21 |
| 2024/0230360 | A1* | 7/2024 | Hashimoto | G01C 21/3469 |
| 2024/0296486 | A1* | 9/2024 | Ghannam | G06Q 10/02 |
| 2025/0086533 | A1* | 3/2025 | ElShenawy | G06Q 10/02 |
| 2025/0189323 | A1* | 6/2025 | Diamond | G01C 21/3461 |
| 2025/0310736 | A1* | 10/2025 | Brannan | B60L 58/12 |
| 2026/0027936 | A1* | 1/2026 | Pettet | B60L 53/64 |

OTHER PUBLICATIONS

Borras, "Chargeway Launches Its Biggest Update Yet", Retrieved on Nov. 27, 2024, Webpage available at https://cleantechnica.com/2023/11/10/chargeway-launches-its-biggest-update-yet/.

"IMT-2020" Wikipedia, Retrieved on Nov. 12, 2024, Webpage available at https://en.wikipedia.org/wiki/IMT-2020.

* cited by examiner

300C

SYSTEMS AND METHODS FOR CHARGING OF VEHICLES BASED ON MOBILITY GRAPHS OF USERS

TECHNOLOGICAL FIELD

The present disclosure generally relates to electric vehicle infrastructure management, and more specifically relates to systems and methods for generating navigation recommendation data tailored for automated charging of electric vehicles.

BACKGROUND

Electric vehicles (EV) are rapidly gaining popularity as a sustainable alternative to traditional gasoline-powered vehicles. They offer significant environmental benefits by reducing greenhouse gas emissions and dependence on fossil fuels. However, the widespread adoption of EV faces many notable challenges arising out of the availability, accessibility, and compatibility of charging stations. The infrastructure for EV charging is still developing in many geographies and varies greatly by region. For example, in many less densely populated areas, the network of charging stations is sparse, making it difficult for EV owners to find convenient locations to recharge. This issue is further compounded by the fact that different EV models may have different charging requirements such as different types of charging connectors, leading to compatibility concerns at many stations. Furthermore, charging an EV may take considerable time and EV owners have to accommodate the charging times into their schedules, thereby further complicating the charging process and usage of EVs.

Current charging solutions do not take these factors into account and are therefore highly non-adaptive to user requirements. Accordingly, better techniques for management of charging infrastructure are required such that they are adaptive to requirements of vehicles, requirements of users of such vehicles, as well as to requirements of the charging infrastructure and owners or providers of such infrastructures. Additionally, there is a need for systems and methods for providing navigation recommendations for charging of vehicles. Still further, there remains a requirement for approaches tailored for automated charging of vehicles considering a multitude of specifications pertaining to vehicles, users associated with such vehicles, charging stations, and operators of such charging stations.

BRIEF SUMMARY OF SOME EXAMPLE EMBODIMENTS

It is an objective of some embodiments of the present disclosure to provide solutions for peer-to-peer charging or charge-sharing of electrically operated vehicles. Some example embodiments are directed towards facilitating charging of vehicles at charging stations that satisfy a plurality of requirements pertaining to the vehicles as well to the charging stations. Som example embodiments also provide charging recommendations tailored to the needs of users of the vehicles and specifics of the charging stations. Various example embodiments are also directed towards determining availability and compatibility of a charging station with an electric vehicle prior to commencement of a journey to such a charging station. Accordingly, some embodiments provide systems and methods for generating a navigation route to a destination, based on factors such as charging requirements of the vehicle, mobility patterns of users of the vehicle, constraints associated with one or more charging stations along the route, and schedules and requirements of owners of such charging stations. Some embodiments are further directed towards mobility planning of electric vehicles in view of the charging requirements of vehicles and charging station availability. Thus, various example embodiments provide an improved charging infrastructure management approach that facilitates lower waiting times for charging of the vehicles, ensures compatibility between vehicles and the charging infrastructure, and enhances the driving range of electric vehicles by replacing hit and trial attempts for charging of the vehicles with a streamlined and directed charging schedule for charging of the vehicles. In essence, various example embodiments lead to better utilization of charging infrastructures while reducing the possibility of malfunctioning of such infrastructure due to incompatibility between the vehicles and infrastructure.

In order to achieve the aforementioned advancements and objectives various example embodiments provide systems, methods, and computer program products for automated charging of electric vehicles. The automated charging may be realized with the aid of navigation recommendation data that provides recommendations in terms of charging stations and routes to those charging stations.

In one aspect, a system for generating navigation recommendation data for a vehicle is provided. The system may comprise a memory configured to store computer-executable instructions and one or more processors configured to execute the computer-executable instructions. In this regard, the one or more processors may obtain a first route between a source and a destination of the vehicle and compute charging data for the vehicle based on the first route. The one or more processors may further determine one or more private charging stations along the first route. Each private charging station of the one or more private charging stations may be associated with a respective host user. The one or more processors may further obtain one or more first constraints associated with each private charging station of the one or more private charging stations and retrieve a host mobility graph of the host user of each private charging station of the one or more private charging stations. The host mobility graph of a corresponding host user defines mobility patterns of the corresponding host user on a first timescale. The one or more processors may further filter the one or more private charging stations to obtain a result, based on the charging data for the vehicle, the one or more first constraints and the host mobility graph and generate at least one second route between the source and the destination, based on the first route and the result. Furthermore, the one or more processors may output the at least one second route.

In additional system embodiments, in order to filter the one or more private charging stations, the one or more processors may compute a relevance score of each private charging station of the one or more private charging stations, based on a threshold condition that defines acceptable levels of requirements of charging the vehicle. The relevance score of a private charging station of the one or more private charging stations indicates an extent to which the private charging station satisfies the requirements of charging the vehicle. Furthermore, the one or more processors may output the result, based on the computed relevance score of each private charging station of the one or more private charging stations.

In additional system embodiments, in an event the charging data indicates a requirement for an intermediate charging of the vehicle along the first route and the result mismatches the requirement for intermediate charging of the vehicle along the first route, the one or more processors may be further configured to determine at least one candidate private charging station among the one or more private charging stations such that the relevance score of the determined at least one candidate private charging station indicates a minimum mismatch to the threshold condition.

In additional system embodiments, the one or more processors may be further configured to transmit a first negotiation prompt to a first user device associated with a host user of the at least one candidate private charging station. The first negotiation prompt may include a message request to modify a mobility plan of the respective host user of the at least one candidate private charging station.

In additional system embodiments, the one or more processors are further configured to transmit a second negotiation prompt to a second under device associated with at least one occupant of the vehicle. The second negotiation prompt includes a message request to modify a mobility plan of the at least one occupant of the vehicle.

In additional system embodiments, the one or more first constraints associated with each private charging station of the one or more private charging stations comprises at least one of: one or more of operational constraints of a respective private charging station of the one or more private charging stations or regulatory constraints of the respective private charging station of the one or more private charging stations.

In additional system embodiments, the one or more processors may be further configured to determine availability data of each private charging station of the one or more private charging stations, based on the host mobility graph of a respective host user of each private charging station of the one or more private charging stations. The one or more processors may be further configured to filter the one or more private charging stations, based on the availability data of each private charging station of the one or more private charging stations.

In additional system embodiments, the one or more processors may be further configured to obtain one or more second constraints associated with at least one occupant of the vehicle. The one or more second constraints may be associated with one or more operational parameters of the vehicle.

In additional system embodiments, the one or more processors may be further configured to compute, for each private charging station of the one or more private charging stations, a match score between the one or more first constraints and the one or more second constraints. The one or more processors may be further configured to filter the one or more private charging stations based on the match score of each private charging station of the one or more private charging stations.

In additional system embodiments, the one or more processors may be further configured to retrieve a visitor mobility graph of at least one occupant of the vehicle. The visitor mobility graph of a corresponding occupant of the vehicle defines mobility patterns of the corresponding occupant on a second time scale. The one or more processors may be further configured to filter the one or more private charging stations based on the visitor mobility graph of the one or more occupants of the vehicle.

In additional system embodiments, in order to filter the one or more private charging stations, the one or more processors may be further configured to assign a weight to each constraint of the one or more first constraints.

In additional system embodiments, in an event the result of filtering is a null value, the one or more processors may be further configured to generate the at least one second route as the first route.

In additional system embodiments, the result comprises one or more filtered private charging stations and to generate the at least one second route, the one or more processors may be configured to modify the first route to include one or more stopovers to the one or more filtered private charging stations.

In additional system embodiments, to compute the charging data for the vehicle, the one or more processors may be further configured to determine electrical energy requirement data of the vehicle for reaching the destination based on the first route and obtain a current charge level of the vehicle and a final charge level of the vehicle. The one or more processors may be further configured to determine the charging data for the vehicle based on the current charge level, the final charge level, and the electrical energy requirement data.

In additional system embodiments, the vehicle may be an autonomous vehicle. The one or more processors may be further configured to generate control commands for maneuvering the autonomous vehicle based on the generated at least one second route.

In another aspect, a computer-implemented method for generating navigation recommendation data for a vehicle is provided. The method may include obtaining a first route between a source and a destination of a vehicle and computing charging data for the vehicle based on the first route. The method may further include determining one or more private charging stations along the first route. Each private charging station of the one or more private charging stations may be associated with a respective host user. The method may further include obtaining one or more first constraints associated with each private charging station of the one or more private charging stations and retrieving a host mobility graph of the host user of each private charging station of the one or more private charging stations. The host mobility graph of a host user defines mobility patterns of the corresponding host user on a first timescale. The method may further include filtering the one or more private charging stations to obtain a result, based on the charging data for the vehicle, the one or more first constraints and the host mobility graph and generating navigation recommendation data for the vehicle, based on the first route and the result. The method may further include outputting the navigation recommendation data.

In additional method embodiments, the navigation recommendation data for the vehicle includes one or more of at least one second route between the source and the destination generated based on the first route and the result or a message prompt indicating feasibility of the at least one second route.

In additional method embodiments, the method may include determining availability data of each private charging station of the one or more private charging stations based on the host mobility graph of a respective host user of the one or more private charging stations. The method may further include filtering the one or more private charging stations based on the corresponding availability data of each private charging station of the one or more private charging stations.

In additional method embodiments, filtering the one or more private charging stations further comprises assigning weights to the one or more first constraints.

In yet another aspect, a computer program product is provided. The computer program product comprises at least one non-transitory computer readable storage medium having stored thereon computer executable instructions which when executed by one or more processors, cause the one or more processors to carry out operations for generating navigation recommendation data for a vehicle. The operations may include obtaining a first route between a source and a destination of a vehicle and computing charging data for the vehicle based on the first route. The operations may further include determining one or more private charging stations along the first route. Each private charging station of the one or more private charging stations may be associated with a respective host user. The operations may further include obtaining one or more first constraints associated with each private charging station of the one or more private charging stations and retrieving a host mobility graph of the host user of each private charging station of the one or more private charging stations. The host mobility graph of a host user defines mobility patterns of the corresponding host user on a first timescale. The operations may further include filtering the one or more private charging stations to obtain a result, based on the charging data for the vehicle, the one or more first constraints and the host mobility graph and generating navigation recommendation data for the vehicle, based on the first route and the result. The operations may further include outputting the navigation recommendation data.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

Figure 1:
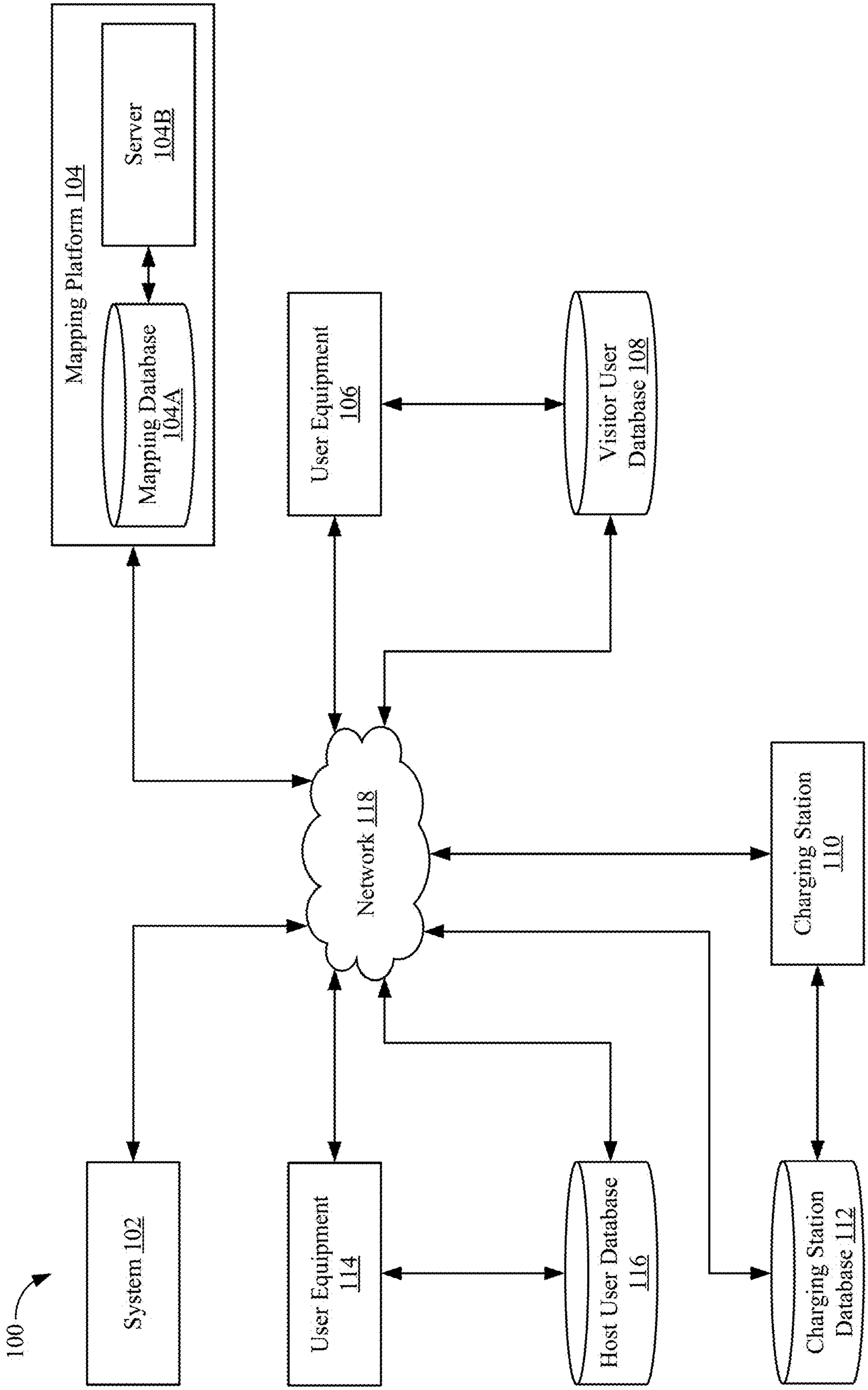
Figure 2:
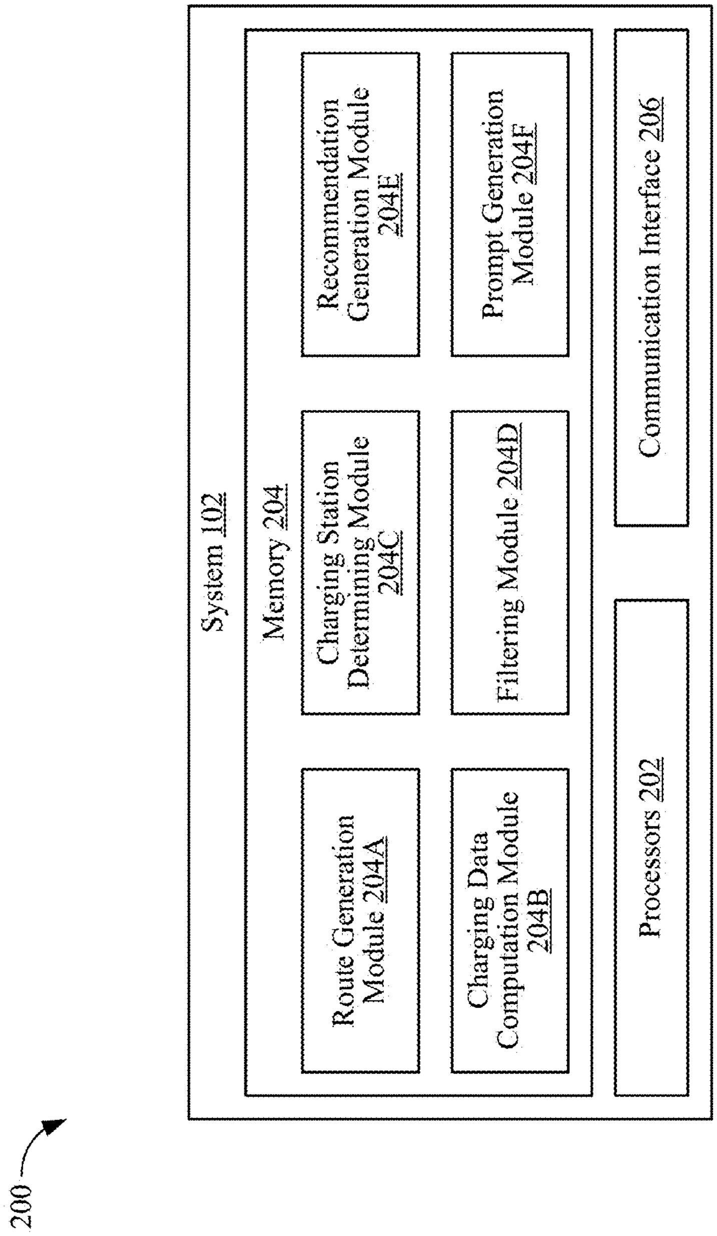
Figure 3A:
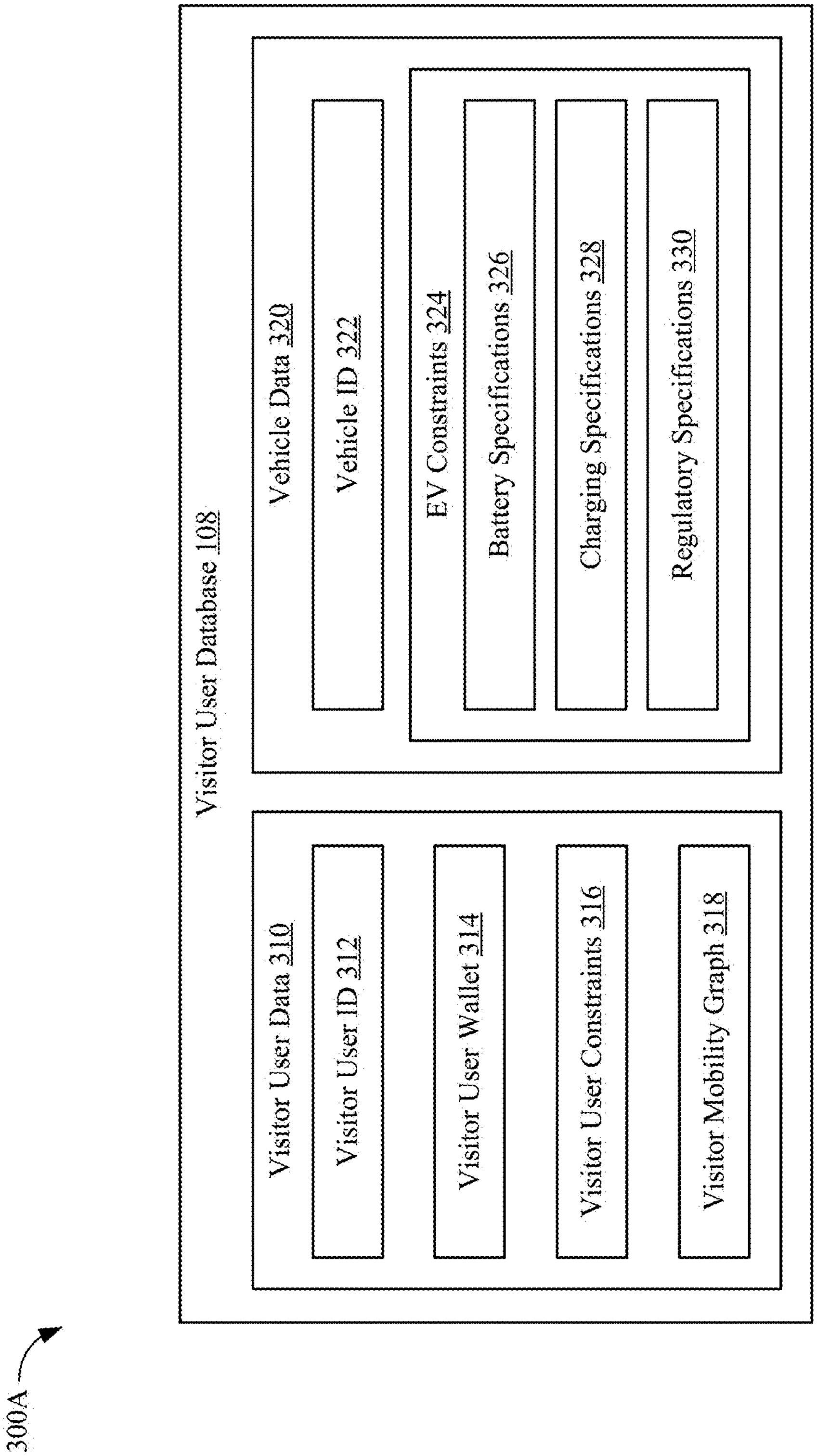
Figure 3B:
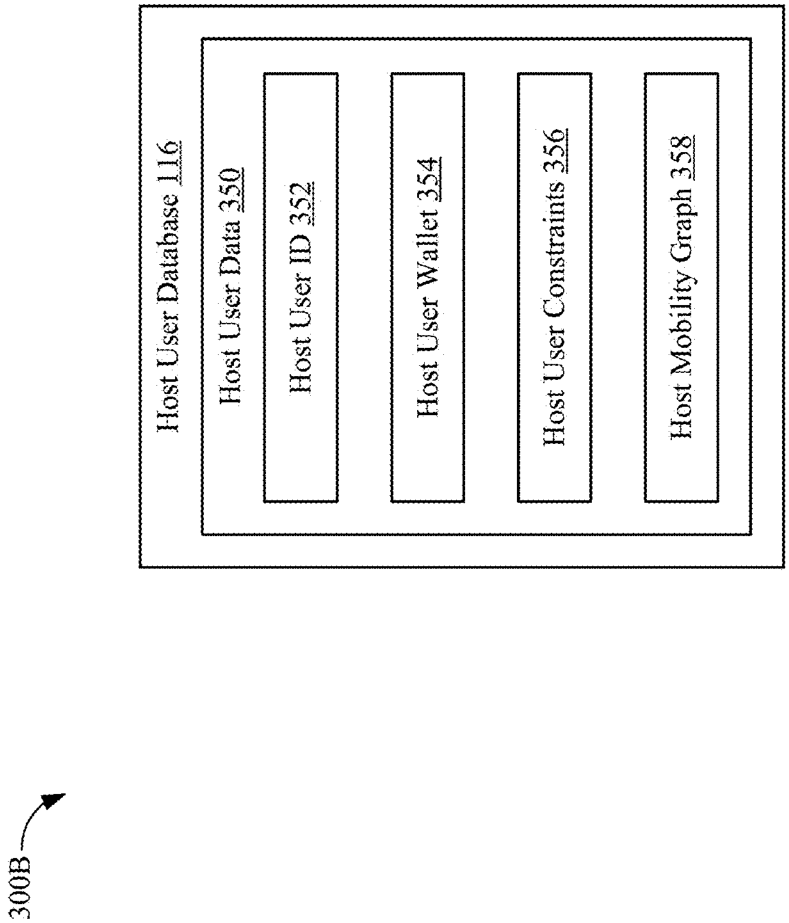
Figure 3C:
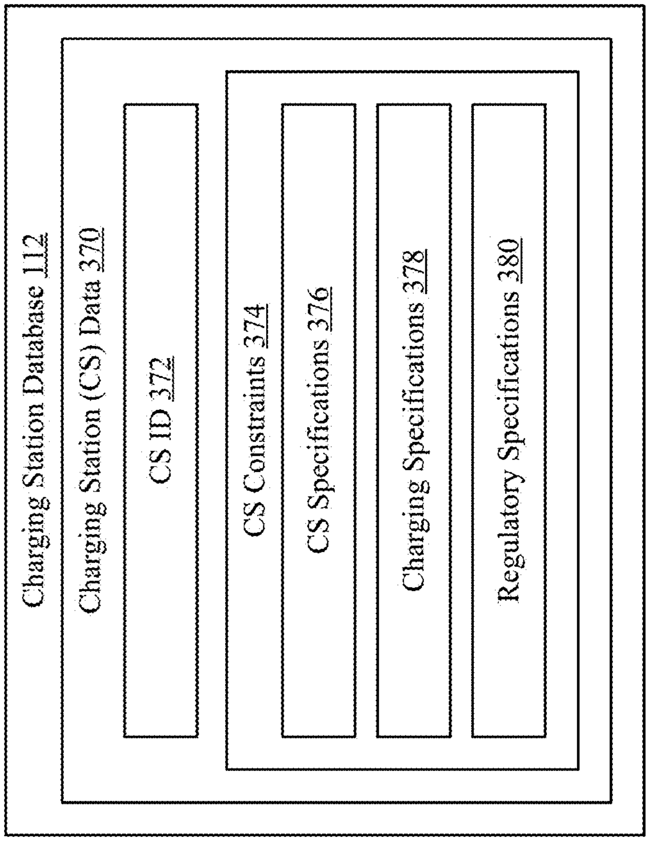
Figure 5A:
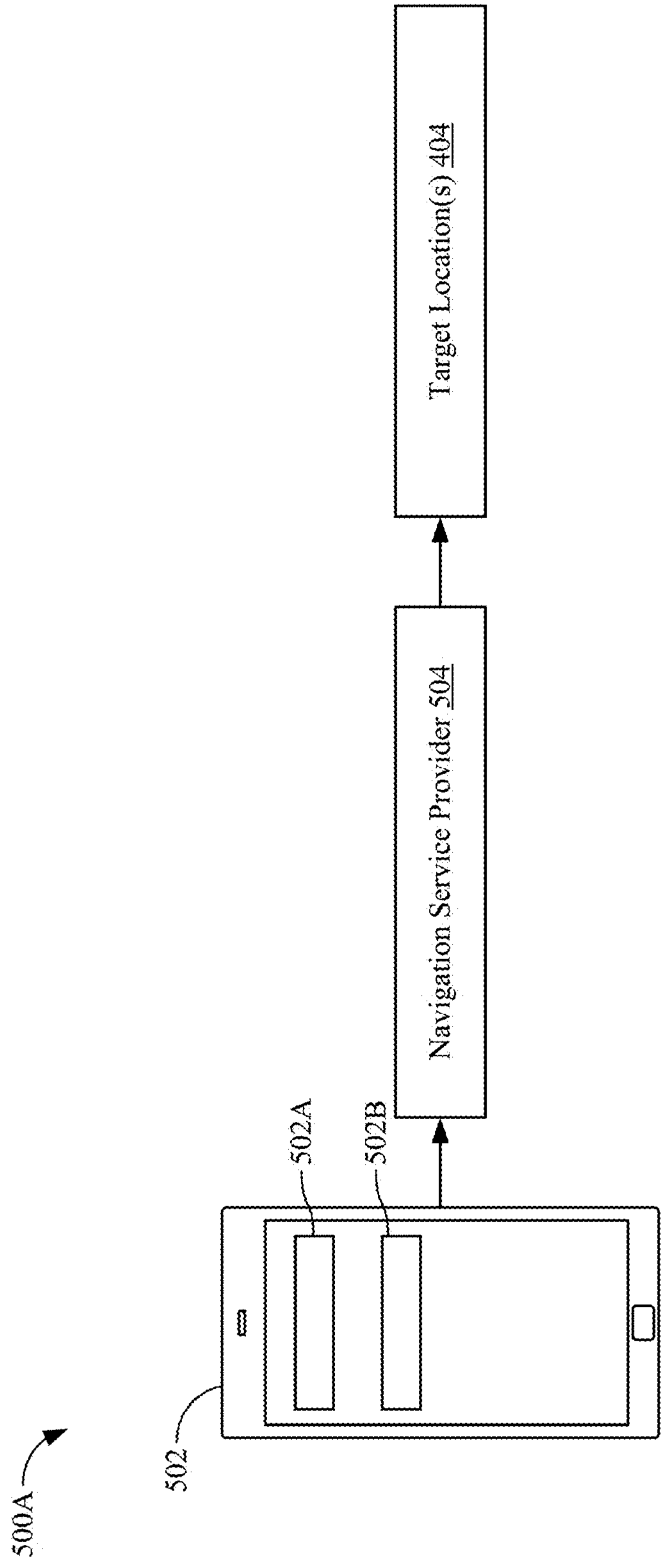
Figure 5B:
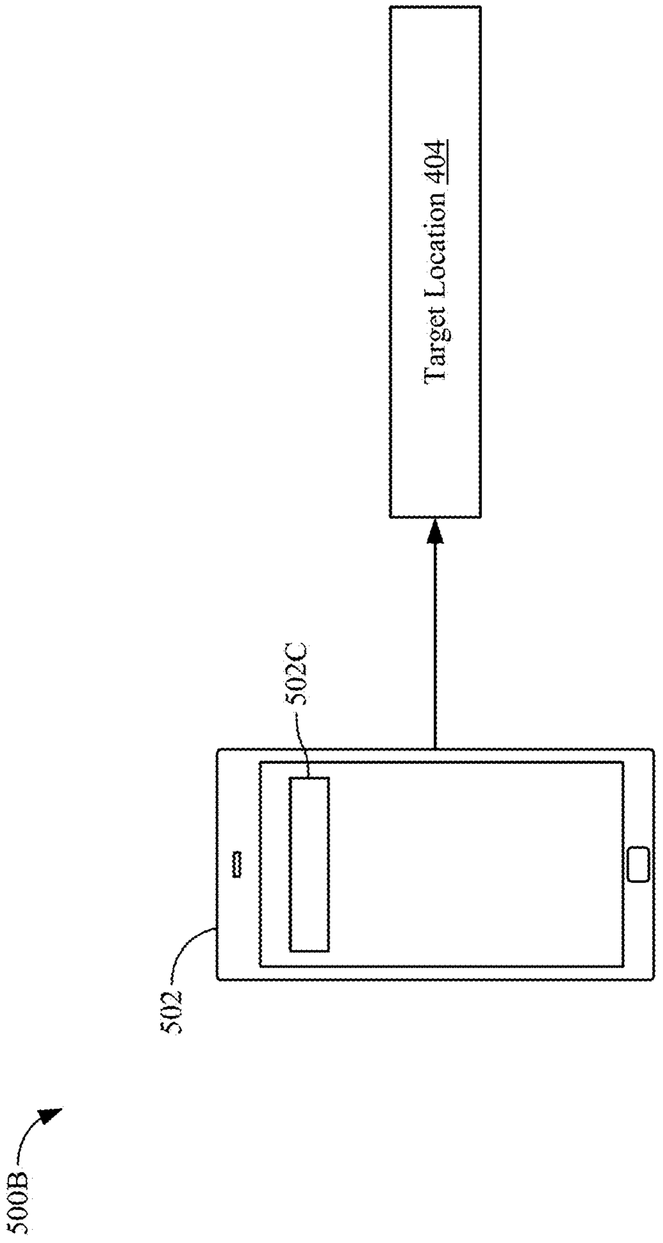
Figure 6:
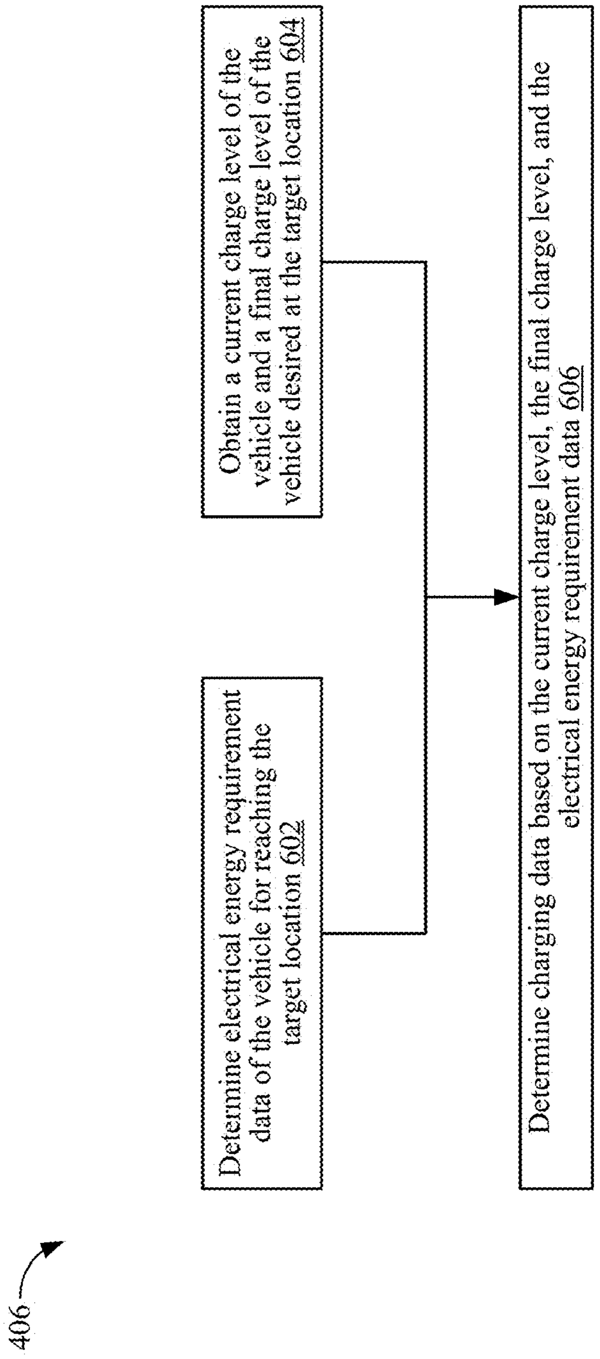
Figure 7:
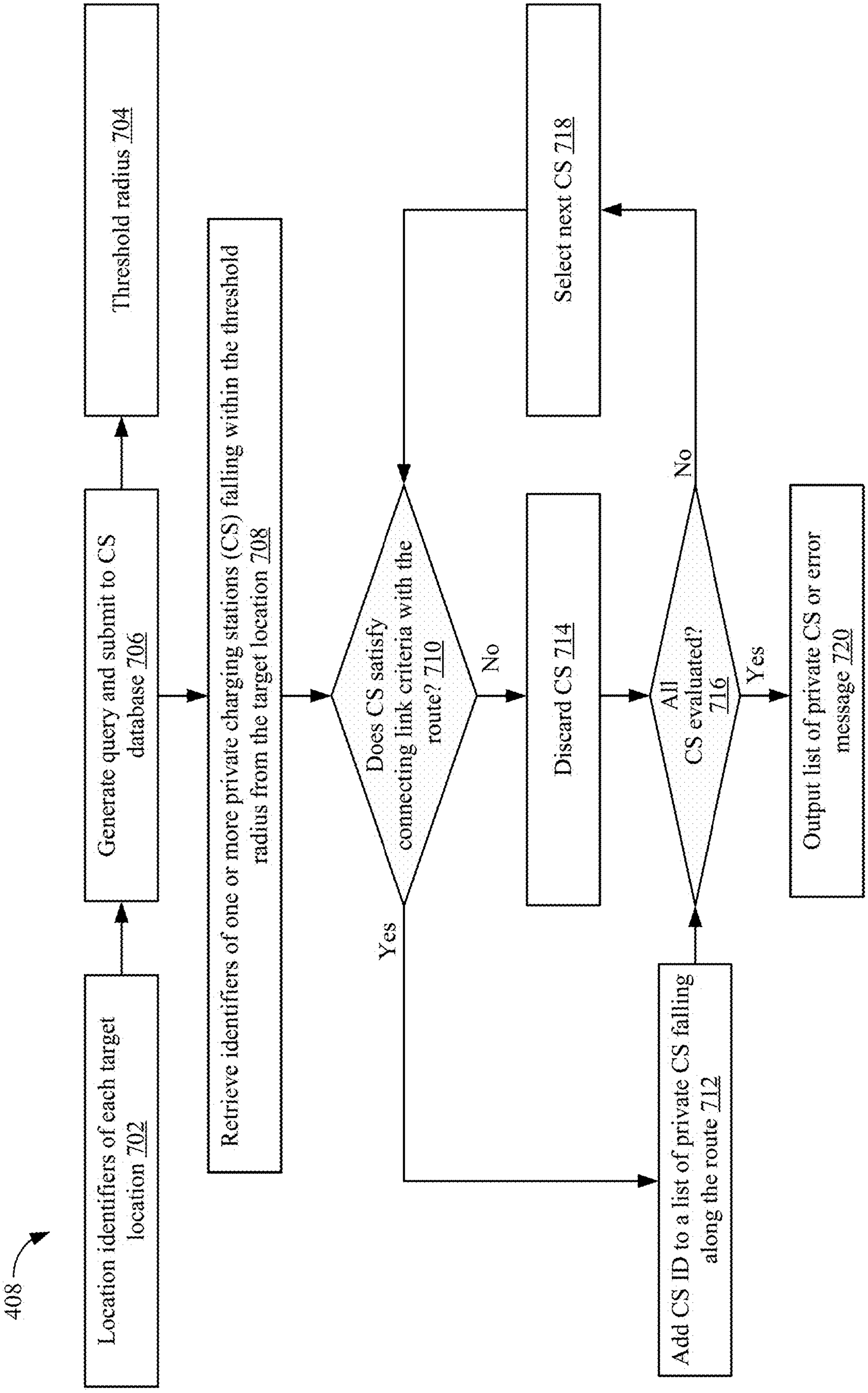
Figure 8:
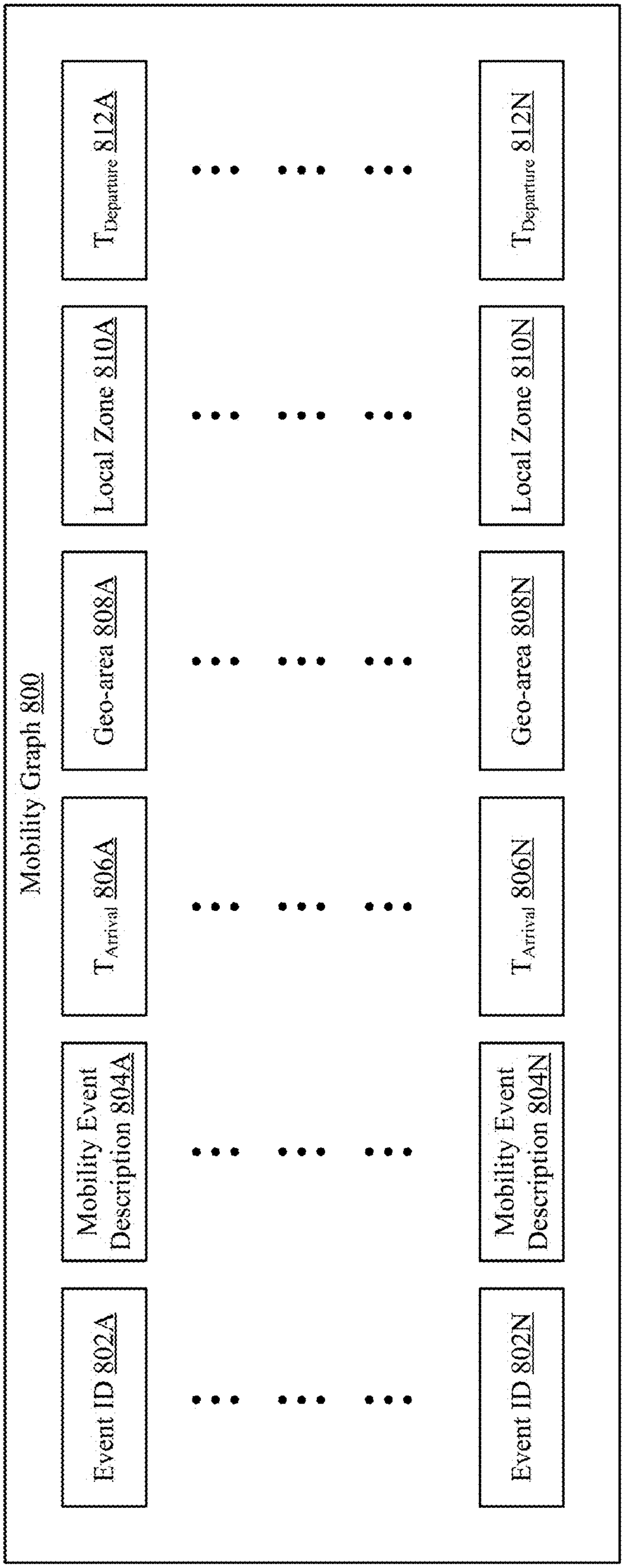
Figure 9:
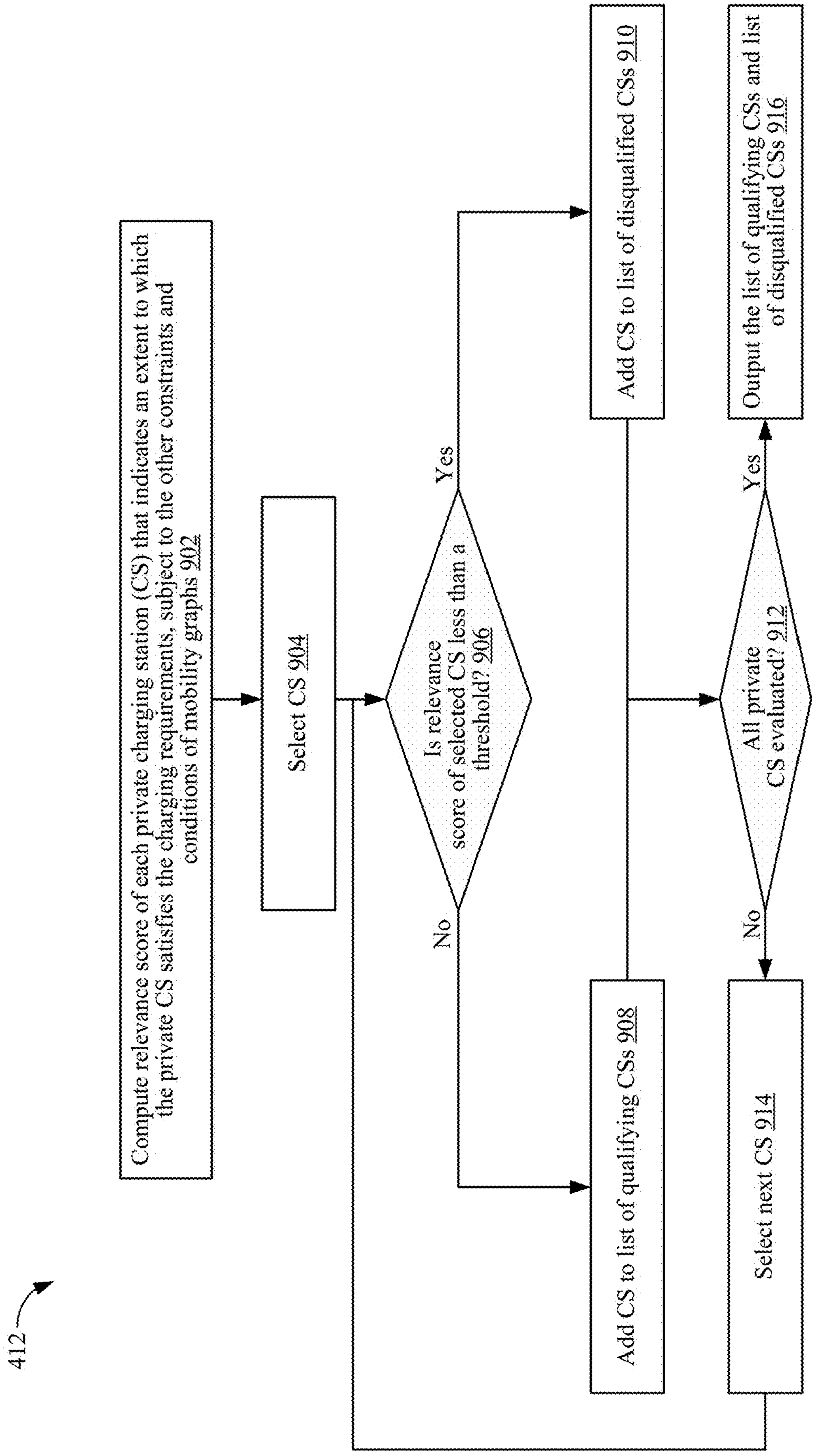
Figure 10:
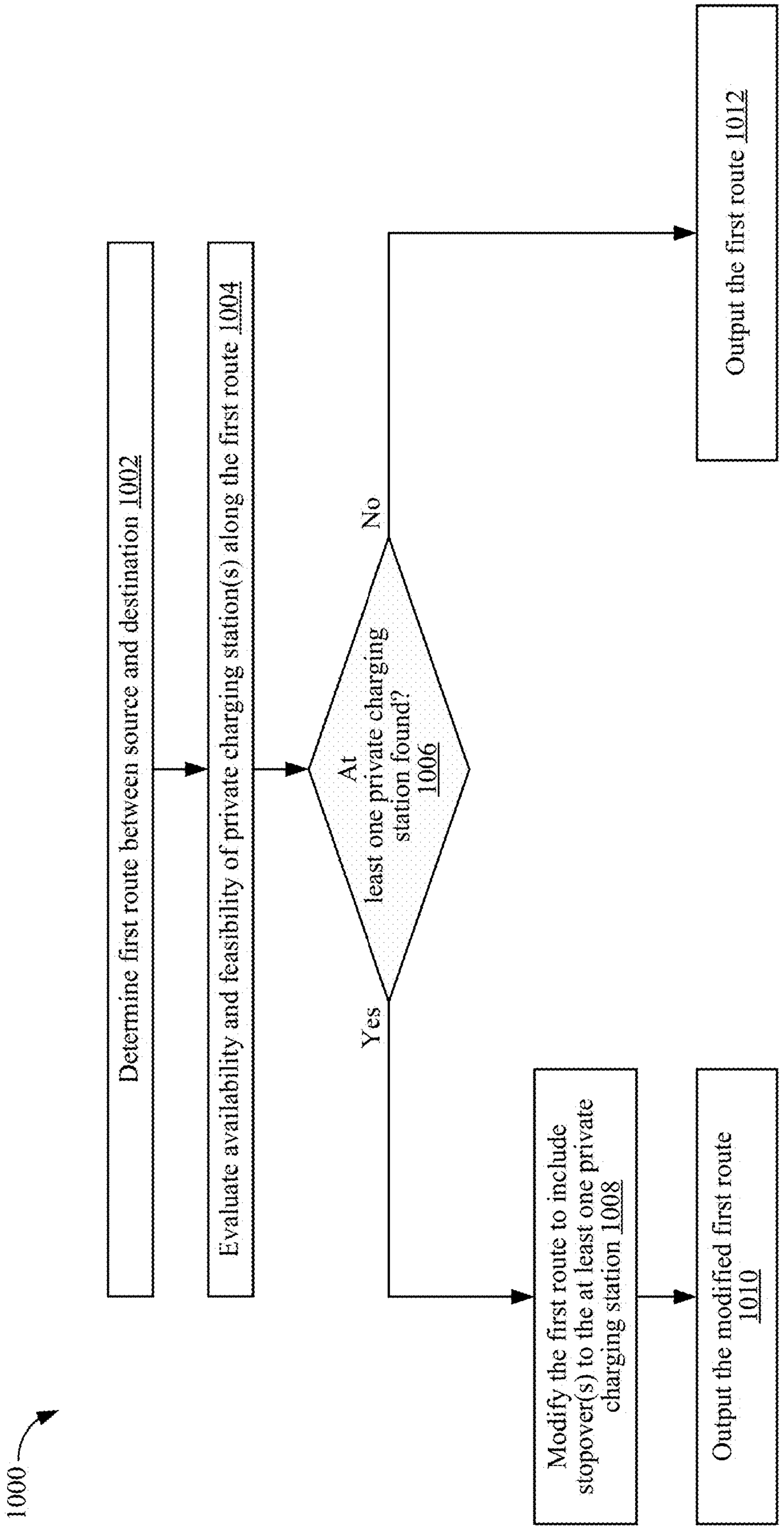
Figure 11:
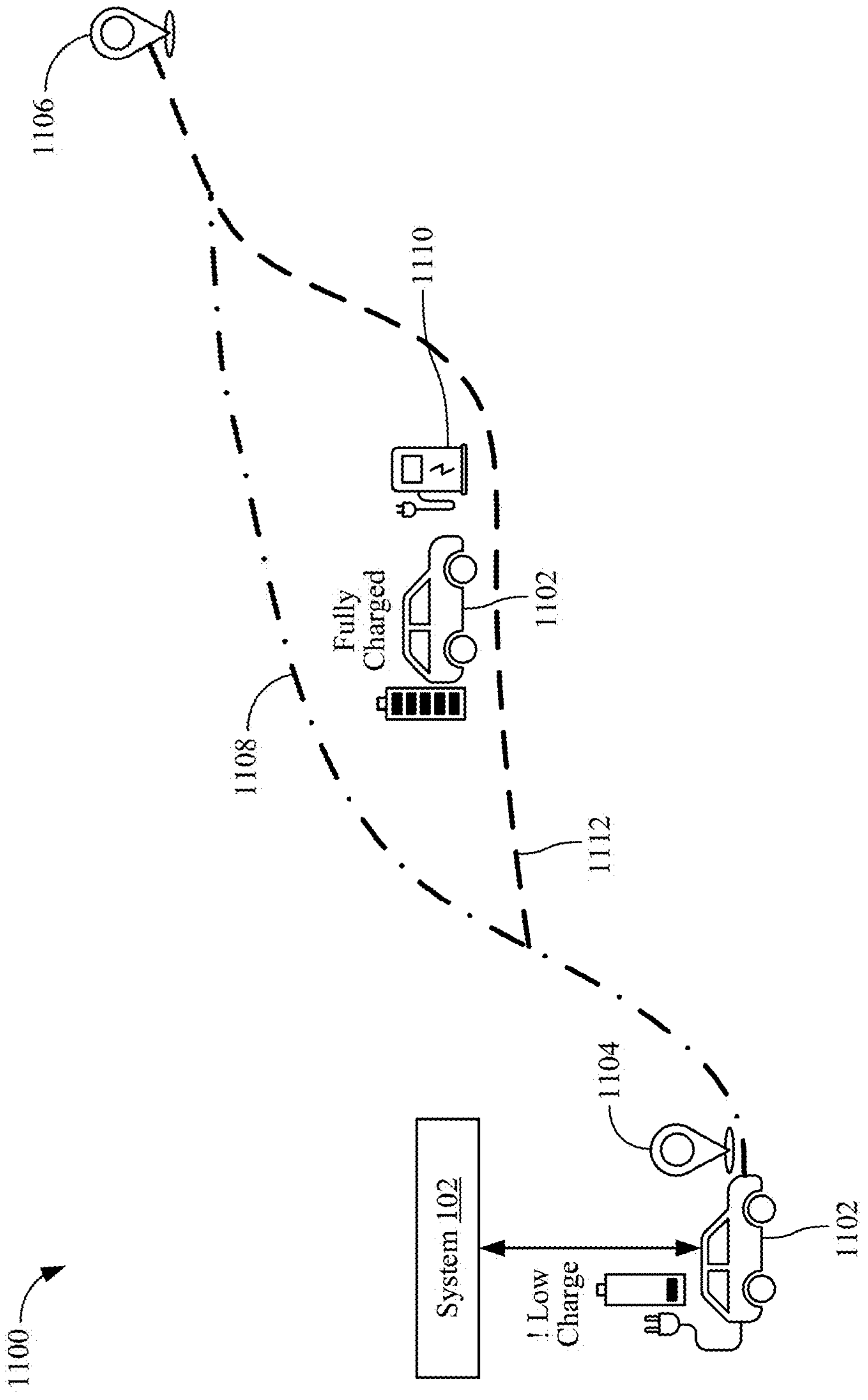
Figure 12:
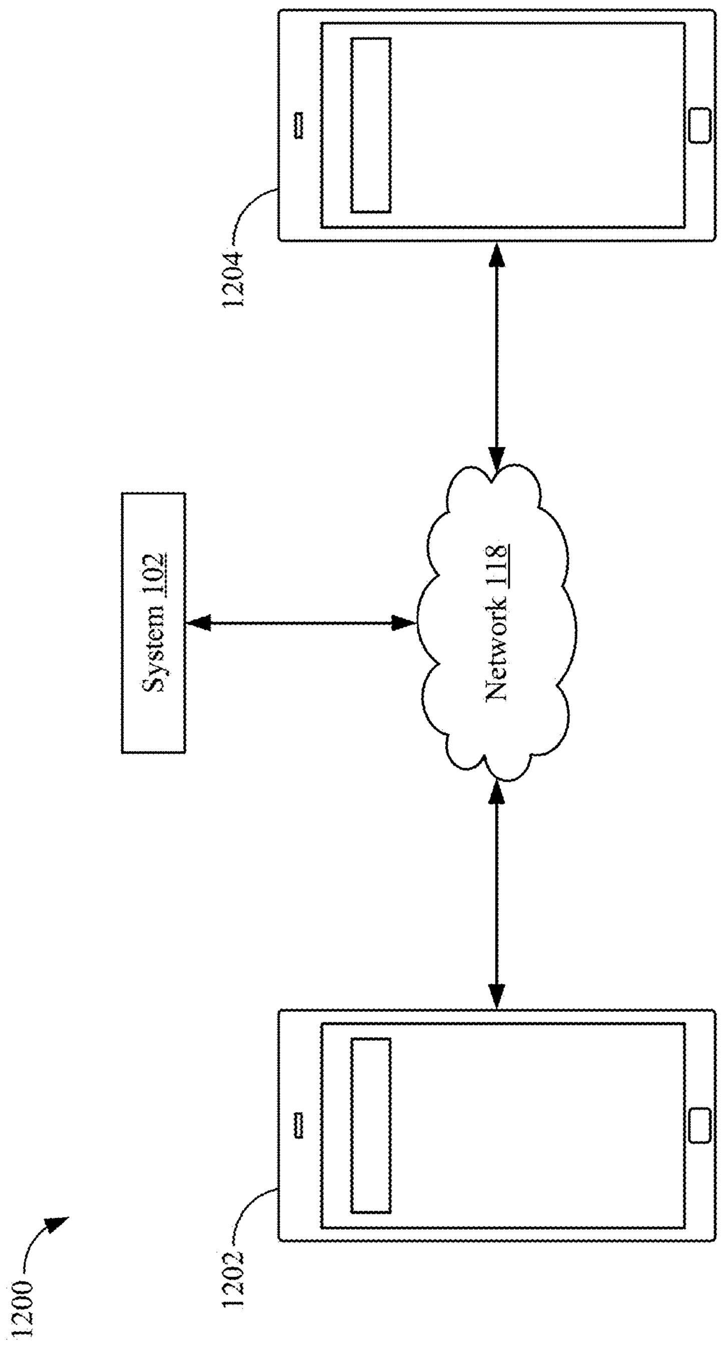
Figure 13:
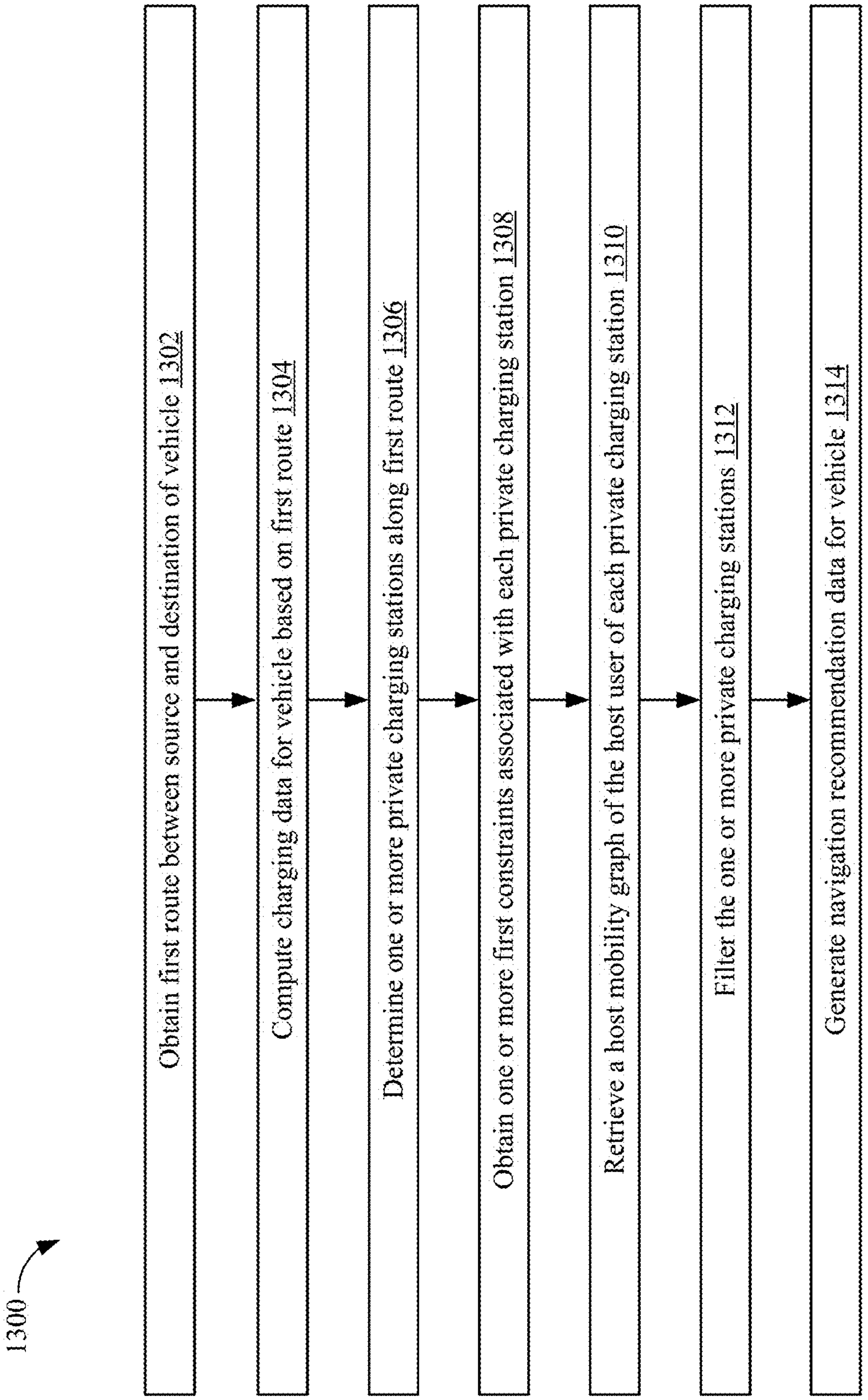

Having thus described example embodiments of the invention in general terms, reference will now be made to the accompanying drawings, which are not necessarily drawn to scale, and wherein:

FIG. 1 illustrates a block diagram showing a network environment of a system for automated charging of vehicles, in accordance with one or more example embodiments;

FIG. 2 illustrates a block diagram showing the system for automated charging of vehicles, in accordance with one or more example embodiments;

FIG. 3A illustrates a block diagram showing an exemplary format of data stored in a visitor user database utilized by the system shown in FIG. 1, in accordance with one or more example embodiments;

FIG. 3B illustrates a block diagram showing a format of data stored in a host user database utilized by the system shown in FIG. 1, in accordance with one or more example embodiments;

FIG. 3C illustrates a block diagram showing a format of data stored in a charging station database utilized by the system shown in FIG. 1, in accordance with one or more example embodiments;

FIGS. 4A-4D jointly illustrate a flowchart of a method for mobility planning for automated charging of vehicles, in accordance with one or more example embodiments;

FIG. 5A illustrates an exemplary framework for fetching target location(s) for mobility planning, in accordance with one or more example embodiments;

FIG. 5B illustrates another exemplary framework for fetching target location(s) for mobility planning, in accordance with one or more example embodiments;

FIG. 6 illustrates a flowchart showing some steps for computing charging data for mobility planning, in accordance with one or more example embodiments;

FIG. 7 illustrates a flowchart showing some steps for determining private charging stations along a route for mobility planning, in accordance with one or more example embodiments;

FIG. 8 shows an example of a mobility graph utilized by the system of FIG. 1, in accordance with one or more example embodiments;

FIG. 9 illustrates a flowchart showing some steps for filtering the private charging stations of FIG. 7 for mobility planning, in accordance with one or more example embodiments;

FIG. 10 illustrates a flowchart of a method for planning mobility of a vehicle, in accordance with one or more example embodiments;

FIG. 11 illustrates an exemplary use case scenario for implementing the method of FIG. 10, in accordance with one or more example embodiments;

FIG. 12 illustrates an exemplary use case scenario for a negotiation-based mobility planning of visitor users and host users for automated charging of vehicles, in accordance with one or more example embodiments; and FIG. 13 illustrates a flowchart of a method for mobility planning for automated charging of electric vehicles, in accordance with one or more example embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses, systems, and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' may refer to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), may be differentiated from a "computer-readable transmission medium," which refers to an electromagnetic signal.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

The widespread adoption of electric vehicles (EV) faces many notable challenges arising out of the availability, accessibility, and compatibility of charging stations. The infrastructure for EV charging is still developing in many geographies and varies greatly by region. There are a large number of factors affecting usage and adoption of EV by users. An important category of such factors includes constraints associated with the charging of the vehicles. Since EVs usually have relatively short operational ranges as compared to fossil fuel powered vehicles, they require frequent and often intermittent charging. Unlike fossil fuel powered vehicles, which can be refueled quickly, electrically powered vehicles require a considerable amount of time for recharging the onboard battery. While there have been some attempts to reduce the charging time, such attempts have only been able to marginally reduce the recharge time of EVs and therefore, users of such vehicles still have to adapt their daily schedules and plans to accommodate the charging time. It is highly frustrating for users of such vehicles to assimilate the uncertainties arising out of this requirement to recharge the vehicle into their daily lives. Also, due to the sort operational range and the requirement to charge frequently, EVs are not considered suitable for long commutes or for busy drivers.

Also, due to the evolving nature of charging infrastructure in several geographies, there is also an uncertainty associated with availability of the charging points or stations. Users have to either rely on random attempts to find a suitable charging spot and time slot or they end with long waiting times and queues at such charging stations. As such, while some charging stations remain underutilized, others are overutilized thereby requiring frequent repairs or maintenance. Furthermore, with increased popularity of peer-to-peer charging schemes where a visitor vehicle can be charged at a host's charging station, the complexity associated with mobility planning for automated charging of such vehicles also increases. All of this further aggrieves the challenges associated with operation of EVs and their charging stations.

Various example embodiments provided herein are directed towards computer-based systems for automated charging of EVs with due consideration given to different factors affecting the charging process and plan. Some example embodiments provide systems and methods for generating navigation recommendations for charging of vehicles. Some example embodiments are directed towards facilitating charging of vehicles at charging stations that satisfy a plurality of requirements pertaining to the vehicles as well to the charging stations. Som example embodiments also provide charging recommendations tailored to the needs of users of the vehicles and specifics of the charging stations. Various example embodiments are also directed towards determining availability and compatibility of a charging station with an electric vehicle prior to commencement of a journey to such a charging station. Accordingly, some embodiments provide systems and methods for generating a navigation route to a destination, based on factors such as charging requirements of the vehicle, mobility patterns of users of the vehicle, constraints associated with one or more charging stations along the route, and schedules and requirements of owners of such charging stations. Some embodiments are further directed towards mobility planning of electric vehicles in view of the charging requirements of vehicles and charging station availability. Thus, various example embodiments provide an improved charging infrastructure management approach that facilitates lower waiting times for charging of the vehicles, ensures compatibility between vehicles and the charging infrastructure, and enhances the driving range of electric vehicles by replacing hit and trial attempts for charging of the vehicles with a streamlined and directed charging schedule for charging of the vehicles. In essence, various example embodiments lead to better utilization of charging infrastructures while reducing the possibility of malfunctioning of such infrastructure due to incompatibility between the vehicles and infrastructure. These and several other advantages will be apparent from the following description of various example embodiments of the disclosure. The ensuing systems and methods that achieve these objectives will be elucidated herein, aided by various figures for clarity.

FIG. 1 illustrates a block diagram showing a network environment 100 of a system 102 for automated charging of vehicles, in accordance with one or more example embodiments. The system 102 may be communicatively coupled, via a network 118, to one or more of a mapping platform 104, a visitor user equipment 106, a visitor user database 108 associated with the user equipment 106, one or more charging stations 110, a charging station database 112 associated with the one or more charging stations 110, a host user equipment 114, and a host user database 116 associated with the host user equipment 114. According to some embodiments, in order to ensure anonymity of users, at least one of the host user equipment 114 or the visitor user equipment 106 may be accessible to the system 102 via an original equipment manufacturer (OEM) cloud. According to some other embodiments, the user equipment 106 and 114 may be directly coupled to the system 102. The components described in the network environment 100 may be further broken down into more than one component such as one or more sensors or application in user equipment (such as the user equipment 106 and/or 114) and/or combined together in any suitable arrangement. Further, it is possible that one or more components may be rearranged, changed, added, and/or removed without deviating from the scope of the present disclosure.

In an example embodiment, the system 102 may be embodied in one or more of several ways as per the desired implementation. For example, the system 102 may be embodied as a cloud-based service, a cloud-based application, a cloud-based platform, a remote server-based service, a remote server-based application, a remote server-based platform, or a virtual computing system. As such, the system 102 may be configured to operate inside the mapping platform 104 and/or inside at least one of the user equipment 106 and the user equipment 114. Where the system 102 is embodied on the user equipment 106 and/or 114, the system 102 may be realized as an application executed by a processor. Some examples of such software applications include a navigation application, a mobility application, or a personal assistant application and the like.

In some embodiments, the visitor user equipment 106 may be installed in or be communicatively coupled to an electric vehicle associated with one or more visitor users. As used herein, a visitor user may be a passenger or driver of the electric vehicle associated with the visitor user equipment 106. In some embodiments, the host user equipment 114 may be associated with or be communicatively coupled to the charging station 110 that is owned or operated by one or more host users. As used herein, a host user may be a person or entity providing vehicle charging service at a charging station such as the charging station 110. Throughout this disclosure, the terms charging station and private charging station may be used interchangeably and may mean the same entity. According to some embodiments, the visitor user associated with the visitor user equipment 106 may want to explore whether charging of an electric vehicle can be done at the charging station 110 (associated with the host user) at a particular time of the day. In such embodiments, the system 102 may determine availability and feasibility of the charging station 110 in view of various control factors pertaining to at least one of the electric vehicle, the charging station 110, the visitor user and the host user. According to some other embodiments, the visitor user may want to commute between a source location and a destination location using an electric vehicle and may want to explore possibility of reaching the destination with intermediate charging. In such an embodiment, the system 102 may determine the availability and feasibility of charging the electric vehicle at the charging station 110 in view of the control factors. According to yet some other embodiments, the system 102 may automatically determine a future charging schedule of the electric vehicle associated with the host user by determining the availability and feasibility of charging the electric vehicle at the charging station 110 in view of the control factors. In some embodiments, if the charging station 110 is determined to be not available or not feasible for charging of the electric vehicle, the system 102 may further perform negotiation with one or both of the visitor user equipment 106 and the host user equipment 114.

In each of such embodiments, the system 102 may be communicatively coupled to the components shown in FIG. 1 to carry out the desired operations and wherever required modifications may be possible within the scope of the present disclosure. The system 102 may be implemented in an electrically operable vehicle (hereinafter also referred to as a vehicle), where the vehicle may be an autonomous vehicle, a semi-autonomous vehicle, or a manually driven vehicle.

In some other embodiments, the system 102 may be embodied as a server of the mapping platform 104 and therefore may be co-located with or within the mapping platform 104. In yet some other embodiments, the system 102 may be implemented within an OEM cloud. Further, in some example embodiments, the system 102 may be a standalone unit configured to perform the mobility planning for automated charging of the electric vehicle associated with the visitor user. Additionally, the system 102 may be coupled with an external device such as the autonomous vehicle.

The mapping platform 104 may comprise the map database 104A (also referred to as geographic database 104A) for storing map data and a processing server 104B for carrying out the processing functions associated with the mapping platform 104. The map database 104A may store, as the map data: node data, road segment data or link data, point of interest (POI) data, and/or road object data. The map database 104A may also store, as the map data, cartographic data and/or routing data. The map database 104A may be maintained by a content provider e.g., a map developer.

As used with some embodiments, the map database 104A may be a master geographic database, but in alternate embodiments, the map database 104A may be embodied as a client-side map database and may represent a compiled navigation database that may be used in or with end user equipment such as the user equipment 106 and/or the user equipment 114 to provide navigation and/or map-related functions. For example, the map database 104A may be used with the user equipment 106 to provide a visitor user with navigation features. In such a case, the map database 104A may be downloaded or stored locally (cached) on the user equipment 106.

The processing server 104B may comprise processing means, and communication means. For example, the processing means may comprise one or more processors configured to process requests received from the user equipment 106. The processing means may fetch map data from the map database 104A and transmit the same to the user equipment 106 in a format suitable for use by the one or both of the user equipment 106. In one or more example embodiments, the mapping platform 104 may periodically communicate with the user equipment 106 and/or the user equipment 114 via the processing server 104B to update a local cache of the map data stored on the user equipment 106 and/or the user equipment 114. Accordingly, in some example embodiments, the map data may also be stored on the user equipment 106 and/or the user equipment 114 and may be updated based on periodic communication with the mapping platform 104 via the network 118.

The network 118 may be wired, wireless, or any combination of wired and wireless communication networks, such as cellular, Wi-Fi, internet, local area networks, or the like. In one embodiment, the network 118 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks (for e.g. LTE-Advanced Pro), 5G New Radio networks, ITU-IMT 2020 networks, code division multiple access (CDMA), wideband code division multiple access (WCDMA), wireless fidelity (Wi-Fi), wireless LAN (WLAN), Bluetooth, Internet Protocol (IP) data casting, satellite, mobile ad-hoc network (MANET), and the like, or any combination thereof.

In some example embodiments, the user equipment 106 and the user equipment 114 may be any user accessible device such as a mobile phone, a smartphone, a portable computer, and the like that are portable in themselves or as a part of another portable/mobile object such as a vehicle. In some other embodiments, the user equipment 106 and/or 114 may be stationed at a fixed location. For example, the host user equipment 114 may be fixed at or in a vicinity of the charging station 110. The user equipment 106 and 114 may comprise a processor, a memory, and a communication interface. The processor, the memory, and the communication interface may be communicatively coupled to each other. In some example embodiments, the user equipment 106 and 114 may be associated, coupled, or otherwise integrated with a vehicle, such as an advanced driver assistance system (ADAS), a personal navigation device (PND), a portable navigation device, an infotainment system and/or other device that may be configured to provide route guidance and navigation related functions to the user. In such example embodiments, the user equipment 106 and 114 may comprise processing means such as a central processing unit (CPU), storage means such as on-board read only memory (ROM) and random access memory (RAM), acoustic sensors such as a microphone array, position sensors such as a GPS sensor, gyroscope, a LIDAR sensor, a proximity sensor, motion sensors such as accelerometer, temperature sensors, voltage sensors, current sensors, display enabled user interface such as a touch screen display, and other components as may be required for specific functionalities of the user equipment 106 and 114. For example, the user equipment 106 and/or 114 may be configured to execute and run mobile applications such as a messaging application, a browser application, a navigation application, and the like.

According to some embodiments, the visitor user equipment 106 may interface with sensors of the electric vehicle associated with the visitor user and provide various types of sensor data to the system 102 for processing. Additionally, the visitor user equipment 106 may also interface with the visitor user database 108 to provide data pertaining to the visitor user to the system 102 for further processing. In some embodiments, the host user equipment 114 may interface with one or more sensors to collect sensor data pertaining to the charging station 110 to the system 102 for processing. Additionally, the host user equipment 114 may also interface with the host user database 116 to provide host data pertaining to the host user to the system 102 for further processing. Further, the system 102 may be communicatively coupled with the charging station database 112 to collect data regarding one or more charging stations such as the charging station 110.

The visitor user database 108 may store data including visitor data regarding the visitor user and vehicle data regarding the one or more electric vehicles of the visitor user. The visitor data may include without limitation: personal information of the visitor user, one or more identifiers of the visitor user, one or more mobility graphs associated with the visitor user, and the like. The vehicle data may include one or more identifiers of the electric vehicle associated with the visitor user, a brand of the electric vehicle, a model of the electric vehicle, year of manufacture of the electric vehicle, battery capacity of the electric vehicle, charging requirements of the electric vehicle, cable or connector type of the electric vehicle, dimensions of the electric vehicle, unloaded weight of the electric vehicle, regulatory information associated with the electric vehicle, and the like.

The host user database 116 may store host data regarding the host user. The host data may include without limitation: personal information of the host user, one or more identifiers of the host user, one or more mobility graphs associated with the host user, and the like. The charging station database 112 may store data regarding one or more charging stations such as the charging station 110 associated with the host user.

The charging station data may include one or more identifiers of the charging station 110, a brand or make of the charging station 110, a model of the charging station 110, number of ports of the charging station 110, current capacity of the charging station 110, availability status of fast charging at the charging station 110, charging technology used by the charging station 110, cable or connector type of the charging station 110, cable or connector availability at the charging station 110, dimensions of the cable or connector of the charging station 110, regulatory information associated with the charging station 110, cost of charging at the charging station 110, and the like.

Each of the databases 108, 112, and 116 may be suitably compiled and maintained by a corresponding entity. For example, the visitor user database 108 may be maintained by the visitor user using the visitor user equipment 106. In this regard, the personal information of the visitor user and the one or more identifiers of the visitor user may be provided or collected through a user interface of the visitor user equipment 106 by the visitor user. Although, FIG. 1 shows one visitor user equipment coupled to the visitor user database 108, it may be contemplated that there may be a plurality of such user equipment coupled to the database 108 and as such the database 108 may serve as a repository of data of a plurality of users and their associated electric vehicles. In some embodiments, a single visitor user may be associated with multiple electric vehicles or one electric vehicle may be tagged with multiple visitor users. According to some embodiments, the database 108 may also have a corresponding processing server associated with it, where the processing server may perform data compilation in the visitor user database 108. In some embodiments, the one or more identifiers may be assigned to the visitor user by the processing server or a suitable software program running on the visitor user equipment 106.

The mobility graph of the visitor user may be a data representation of movement patterns of the visitor user defined with reference to a suitable timescale. For example, the mobility graph of the visitor user may represent a predicted timeline of the visitor user in terms of mobility events, locations, and activities that are defined relative to time. As an example, one entry of the mobility graph may indicate that the visitor user leaves for gym from home at 8:00 AM, reaches the gym around 8:15 AM, leaves for home from the gym at 9:30 AM, and so on. Additionally, or optionally, the mobility graph may also indicate the travel modes for each commute. The mobility graph may be compiled using historical location data of the visitor user, historical input data provided by the visitor user, historical activity data of the visitor user, historical and future calendars and schedules of the visitor user, historical connection port data, and the like.

As described previously, the visitor user database 108 may also store vehicle data regarding the one or more electric vehicles of the visitor user. In this regard, the vehicle data may include one or more identifiers of the electric vehicle associated with the visitor user, a brand of the electric vehicle, a model of the electric vehicle, year of manufacture of the electric vehicle, battery capacity of the electric vehicle, charging requirements of the electric vehicle, cable or connector type of the electric vehicle, dimensions of the electric vehicle, unloaded weight of the electric vehicle, regulatory information associated with the electric vehicle, and the like. The vehicle data may be compiled automatically each time the electric vehicle is connected with the visitor user equipment. In some other embodiments, the visitor user may manually specify some or all of the vehicle data. In yet some other embodiments, the processing server of the database 108 may obtain some or all of the vehicle data from heterogenous sources such as the internet and sensors. For example, the battery capacity data may be sensed by a suitable sensor of the vehicle.

According to some embodiments, the host user database 116 may be maintained by the host user using the host user equipment 114. In this regard, the personal information of the host user and the one or more identifiers of the host user may be provided or collected through a user interface of the host user equipment 114 by the host user. Although, FIG. 1 shows one host user equipment coupled to the host user database 116, it may be contemplated that there may be a plurality of such user equipment coupled to the database 116 and as such the database 116 may serve as a repository of data of a plurality of host users and their associated charging stations. In some embodiments, a single host user may be associated with multiple charging stations or one charging station may be tagged with multiple host users. According to some embodiments, the database 116 may also have a corresponding processing server associated with it, where the processing server may perform data compilation in the visitor user database 108. In some embodiments, the one or more identifiers may be assigned to the host user by the processing server or a suitable software program running on the host user equipment 114.

The mobility graph of the host user may be a data representation of movement patterns of the host user defined with reference to a suitable timescale. For example, the mobility graph of the host user may represent a predicted timeline of the host user in terms of mobility events, locations, and activities that are defined relative to time. As an example, one entry of the mobility graph may indicate that the host user reaches home from office at 5:30 PM, stays at home till 8:00 PM, leaves for sports academy from home at 8:00 PM, reaches the academy around 8:15 PM, leaves for home from the academy at 9:15 PM, and so on. Additionally, or optionally, the mobility graph may also indicate the travel modes for each commute by the host user. The mobility graph may be compiled using historical location data of the host user, historical input data provided by the host user, historical activity data of the host user, historical and future calendars and schedules of the host user, historical connection port data, and the like.

As described previously, the charging station data stored by the charging station database 112 may include one or more identifiers of the charging station 110, a brand or make of the charging station 110, a model of the charging station 110, number of ports of the charging station 110, current capacity of the charging station 110, availability status of fast charging at the charging station 110, charging technology used by the charging station 110, cable or connector type of the charging station 110, cable or connector availability at the charging station 110, dimensions of the cable or connector of the charging station 110, regulatory information associated with the charging station 110, cost of charging at the charging station 110, and the like.

The charging station database 112 may be maintained by the host user providing charging services using the charging station 110. In this regard, the charging station data may be compiled automatically each time the charging station 110 is connected with the host user equipment 114. In some other embodiments, the host user may manually specify some or all of the charging station data. Although, FIG. 1 shows one charging station coupled to the charging station database 112, it may be contemplated that there may be a plurality of such charging stations coupled to the database 112 and as such the database 112 may serve as a repository of data of a plurality of charging stations.

In operation, the system 102 may be configured to obtain a target location for determining availability and feasibility of charging facility at the target location. For example, the target location may be provided as an input by a visitor user via the visitor user equipment 106 or may be provided by some other program such as a navigation application. In some embodiments, there may be multiple target locations, each corresponding to a location on a route connecting a source and a destination. For each target location, the system 102 may perform mobility planning for automated charging of the electric vehicle associated with the visitor user. In this regard, the system 102 may query the charging station database 112 using the target location to determine one or more charging stations that are within a threshold distance or threshold radius from the target location. Additionally, or optionally, the system 102 may refine the selection of one or more charging stations based on a connecting link criterion that specifies that each charging station should have at least one connecting link with the target location. The refining returns one or more qualified charging stations when at least one charging station satisfies the connecting link criterion. Alternately, when no charging satisfies the connecting link criterion, the filtering may return a null value.

The system 102 may further filter the one or more qualified charging stations according to one or more constraints pertaining to the host user, one or more constraints pertaining to the visitor user, and one or more constraints associated with the electric vehicle. In yet some embodiments, the system 102 may further filter the one or more qualified charging stations subject to the mobility graphs of the host user and/or the visitor user.

The system 102 may further generate navigation recommendation data for the electric vehicle if the visitor user based on the result of the filtering. For example, the system 102 may generate a navigation route to the targe location that passes through the filtered one or more charging stations. In this regard, the system 102 may interface with the mapping platform 104 to obtain map data for generating the route. Additionally, the system 102 may indicate the time instances of arrival and departure for each charging station of the filtered one or more charging stations. According to some embodiments, as a part of the navigation recommendation data, the system 102 may further provide information indicative of specifications of the charger, cost of charging, time duration required for charging, and the like. Where the filtering returns no charging station satisfying the control constraints, the system 102 may generate a negotiation prompt for at least one of the visitor user equipment 106 or the host user equipment 114, as a part of the navigation recommendation data. The system 102 may further output the navigation recommendation data in any suitable way. For example, when the system 102 is embodied as a remote server, the system 102 may transmit the navigation recommendation data to the visitor user equipment 106. In some other embodiments, when the system 102 is embodied within the visitor user equipment, the system 102 may render the navigation recommendation data through a suitable output interface on the visitor user equipment 106. In yet some other embodiments, the system 102 may control one or more operations of the electric vehicle in accordance with the generated navigation recommendation data.

Thus, the system 102 provides avenues for efficient mobility planning of electric vehicles at the visitor end in such a manner that reduces range anxiety, improves the operating range of the vehicle without requirement of any additional resources in the vehicle, and optimizes the utilization of charging stations in a manner that reduces malfunctioning, underutilization, and overutilization of the charging stations. Thus, the system 102 steers technical improvements and advancements in the field of electric vehicle mobility and charging and improves the usage and adoption of electric vehicles for commute and transportation.

FIG. 2 illustrates a block diagram 200 showing the system 102 for automated charging of vehicles, in accordance with one or more example embodiments. FIG. 2 will be described in conjunction with FIG. 1. The system 102 may include one or more processors 202, a memory 204, and a communication interface 206. The memory 204 stores computer-executable programs and data utilized for implementing the mobility planning of electric vehicles. In this regard, the memory 204 may store various software modules for executing a method for automated charging of vehicles. According to some embodiments, the modules stored in the memory may include a route generation module 204A, a charging data computation module 204B, a charging station determining module 204C, a filtering module 204D, a recommendation generation module 204E, and a prompt generation module 204F. According to some embodiments, the system 102 may further include other components, not shown in FIG. 2 for the sake of brevity, such as a data collection unit for collecting data from external sources, a data output unit for rendering or transmitting data to external devices, a power supply unit, and the like.

In some embodiments, the route generation module 204A may be executed by the one or more processors 202 to obtain one or more target locations where availability and feasibility of charging an electric vehicle is to be ascertained. Additionally, if desired, the route generation module 204A may also generate a route between a source location and a destination location. According to some embodiments, the target location may be selected as the destination location. According to some other embodiments, the target location may be a point between the source and destination locations. Thus, the target location may be a single location obtained as an input from a user such as the visitor user. Alternately, there may be multiple target locations that may be obtained from external agents such as a mobility service provider or a navigation service provider that invokes the system 102 to determine feasible and available charging stations along a route. In such embodiments, the target locations may correspond to point locations along the route, where the point locations may be at fixed or random intervals on the route. For each such target location, the system 102 may be configured to execute mobility planning in accordance with various embodiments described herein.

According to some embodiments, a visitor user may want to explore the possibility of charging a vehicle at the target location which can be a familiar place for the visitor user. The visitor user may specify the target location and the desired charge level at the target location (for example, expressed as battery percentage or KWh or in terms of distance range of the vehicle) with which the user may want to depart from the target location. In such embodiments, the charging data computation module 204B may compute the total electrical power required to depart from the target location, starting from the current location of the vehicle and the current charge level of the vehicle's battery. The total electrical power required may be computed as a sum of the power required to reach the target location from the current location and the amount of power required for charging the battery to reach the desired charge level at the target location.

According to some other embodiments, the visitor user may want to commute between a source location and a destination location using the electrical vehicle. Thus, when the system 102 is implemented for navigation purposes, the charging data computation module 204B may compute the amount of electrical power required for reaching a destination. In such embodiments, the system 102 may invoke the charging data computation module 204B to compute the amount of electrical power required to reach the destination from the current location of the vehicle via the source location. In some embodiments, the current location may be same as the source location and as such the charging data computation module 204B may compute the amount of electrical power required to reach the destination from the current location of the vehicle.

Further, irrespective of the implementations of the system, the charging data computation module 204B may further specify the charging requirements of the vehicle. For example, when the total electrical power required is less than the current power level stored in the battery of the vehicle, the charging data computation module 204B may output a null value indicative of no requirement for intermediate charging of the vehicle. However, where the total electrical power required is more than or equal to the current power level stored in the battery of the vehicle, the charging data computation module 204B may output an amount of charging required for the vehicle as the difference of the total electrical power required and the current power level stored in the battery of the vehicle. The amount of charging required may itself be indicative of a requirement for intermediate charging of the vehicle. According to some embodiments, if the amount of charging required is more than the total power storage capacity of the vehicle, the charging data computation module 204B may output a message indicating requirement for multiple intermediate charging sessions for the vehicle during the commute to the target location.

The one or more processors 202 may execute the charging station determining module 204C to determine one or more charging stations along the route to the target location at least on the basis of the output provided by the charging data computation module 204B. Various example embodiments ensure that a diverse group of conditions and constraints may be taken into consideration in determining the charging stations such that the uncertainty associated with charging of vehicles is reduced substantially if not eliminated. In this regard, the charging station determining module 204C may collect a multitude of data types from the visitor user database 108, the charging station database 112, the host user database 116 as well as various sensors and interfaces available with the visitor user equipment 106 and the host user equipment 114. Thus, by taking data and constraints related to each participant of the charging process into consideration, various example embodiments improve the reliability and efficiency of the resultant charging process.

It may be noted that modules 204A-204C may only be executed when charging stations are unknown beforehand. However, when the visitor user already knows of a charging station and wants to explore the possibility of charging the vehicle at such a charging station without specifying the desired charge level with which the visitor user may want to exit from such a charging station, the system 102 may skip execution of the route generation module 204A, the charging data computation module 204B, and the charging station determining module 204C. In this regard, the system 102 may utilize a user interface to seek a confirmation input from the visitor user regarding whether search for available charging stations is desired or possibility of charging at a particular charging station is t be explored. Accordingly, the system 102 may decide to execute or skip the modules 204A-204C.

The system 102 may further execute the filtering module 204D to select only that/those charging station(s) which satisfy a plurality of constraints and conditions imposed by factors governing the charging of the vehicle. For example, the filtering module 204D may utilize constraints on the vehicle, the visitor user, the host user, and the charging station to filter the one or more charging stations determined by the charging station determining module 204C or provided as input by the visitor user. A detailed working of the filtration process is described later in the disclosure with reference to FIGS. 4A and 9. Accordingly, the filtering module 204D may either output at least one qualifying charging station or at least one candidate charging station that falls short of satisfying the constraints and conditions by the shortest margin.

Accordingly, the one or more processors 202 may invoke the recommendation generation module 204E to generate navigation recommendation data for the visitor equipment 106 and/or the host user equipment 114. For example, if at least one qualifying charging station is output by the filtering module 204D, the recommendation generation module 204E may generate a route to such a qualifying charging station. However, if no charging station fully satisfies the constraints and conditions imposed by the filtering module 204D, the recommendation generation module 204E may generate a navigation recommendation for the visitor user seeking confirmation on whether to proceed with the at least one candidate charging station output by the filtering module 204D. Upon receiving the confirmation input from the visitor user, the recommendation generation module 204E may pass the control to the prompt generation module 204F. According to some embodiments, instead of seeking the confirmation input from the visitor user, the system 102 may directly proceed to executing the prompt generation module 204F upon receiving the at least one candidate charging station output by the filtering module 204D.

The prompt generation module 204F may be invoked by the one or more processors 202 to generate one or more suitable negotiation prompt indicating a modification required to mobility plan of the visitor user and/or the host user. In this regard, the prompt generation module 204F may fetch details of the host user associated with the at least one candidate charging station output by the filtering module 204D and transmit a prompt to the host user or the visitor user, as the case may be. For example, if the at least one candidate charging station falls short of satisfying the constraints and conditions due to constraints of the host user of the at least one candidate charging station, the prompt generation module 204F may transmit a negotiation prompt to the host user of the at least one candidate charging station. The prompt may indicate a request to modify the mobility plan of the host user or reduce a cost of charging charged by the host user, or increase the availability time of the at least one charging station for the visitor user and so on. However, if the at least one candidate charging station falls short of satisfying the constraints and conditions due to constraints of the visitor user, the prompt generation module 204F may transmit a negotiation prompt to the visitor user. The prompt may indicate a request to modify the mobility plan of the visitor user or increase a cost of charging payable by the visitor user, or reduce the availability time of the at least one charging station desired by the visitor user and so on. Similarly, if the at least one candidate charging station falls short of satisfying the constraints and conditions due to constraints of the vehicle associated with the visitor user, the prompt generation module 204F may transmit a negotiation prompt to the visitor user. For example, the at least one candidate charging station may fall short of satisfying the constraints and conditions due to the non-availability of the desired cable type at the at least one charging station. In such a scenario, the prompt generation module 204F may generate the prompt to indicate a request to the visitor user to carry their own charging cable.

According to some embodiments, the memory 204 may also store other programs such as a vehicle control program to control one or more functionalities of the vehicle associated with a visitor user. As such, in some embodiments the one or more processors 202 may execute such a control program and control the one or more functionalities of the vehicle in accordance with the output generated by the recommendation generation module 204E and/or the prompt generation module 204F.

The one or more processors 202 may be embodied in a number of different ways. For example, the one or more processors 202 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the one or more processors 202 may include one or more processing cores configured to perform independently. A multi-core processor may enable multiprocessing within a single physical package. Additionally, or alternatively, the one or more processors 202 may include one or more processors configured in tandem via the bus to enable independent execution of instructions, pipelining and/or multithreading.

Additionally, or alternatively, the one or more processors 202 may include one or more processors capable of processing large volumes of workloads and operations to provide support for big data analysis. In an example embodiment, the one or more processors 202 may be in communication with the memory 204 via a bus. The memory 204 may be non-transitory and may include, for example, one or more volatile and/or non-volatile memories. In other words, for example, the memory 204 may be an electronic storage device (for example, a computer readable storage medium) comprising gates configured to store data (for example, bits) that may be retrievable by a machine (for example, a computing device like the one or more processors 202). The memory 204 may be configured to store information, data, content, applications, instructions, or the like, for enabling the system 102 to carry out various functions in accordance with an example embodiment of the present disclosure. For example, the memory 204 may be configured to buffer input data for processing by the one or more processors 202.

As exemplarily illustrated in FIG. 2, the memory 204 may be configured to store instructions for execution by the one or more processors 202. As such, whether configured by hardware or software methods, or by a combination thereof, the one or more processors 202 may represent an entity (for example, physically embodied in circuitry) capable of performing operations according to an embodiment of the present disclosure while configured accordingly. Thus, for example, when the one or more processors 202 is embodied as an ASIC, FPGA or the like, the one or more processors 202 may be specifically configured hardware for conducting the operations described herein. Alternatively, as another example, when the one or more processors 202 is embodied as an executor of software instructions, the instructions may specifically configure the one or more processors 202 to perform the algorithms and/or operations described herein when the instructions are executed. However, in some cases, the one or more processors 202 may be a processor specific device (for example, a mobile terminal or a fixed computing device) configured to employ an embodiment of the present disclosure by further configuration of the one or more processors 202 by instructions for performing the algorithms and/or operations described herein. The one or more processors 202 may include, among other things, a clock, an arithmetic logic unit (ALU) and logic gates configured to support operation of the one or more processors 202.

In some embodiments, the one or more processors 202 may be configured to provide Internet-of-Things (IoT) related capabilities to a user of the system 102, where the user may be a traveler, a driver of the vehicle and the like. In some embodiments, the user may be or correspond to an autonomous or semi-autonomous vehicle. The IoT related capabilities may in turn be used to provide smart navigation solutions by providing real time updates to the user to take pro-active decision on lane maintenance, speed determination, lane-level speed determination, turn-maneuvers, lane changes, overtaking, merging and the like. The system 102 may be accessed using the communication interface 206 The communication interface 206 may provide an interface for accessing various features and data stored in the system 102. For example, the communication interface 206 may comprise I/O interface which may be in the form of a GUI, a touch interface, a voice enabled interface, a keypad, and the like. For example, the communication interface 206 may be a touch enabled interface of a navigation device installed in a vehicle, which may also display various navigation related data to the user of the vehicle.

FIG. 3A illustrates a block diagram 300A showing an exemplary format of data stored in a visitor user database 108 utilized by the system shown in FIG. 1, in accordance with one or more example embodiments. The visitor user database 108 may store visitor user data 310 for each visitor user and electric vehicle data 320 associated with each such visitor user. The visitor user data 310 of a visitor user may include a visitor user identifier 312, a visitor user wallet 314, one or more visitor user constraints 316 associated with the visitor user, and a visitor mobility graph 318 of the visitor user. Additionally, the visitor user data 310 may also include personal information of the visitor user. The visitor user identifier 312 may be provided or collected through a user interface of the visitor user equipment 106. The visitor user identifier 312 may be used by the system 102 to identify a visitor user. The visitor user wallet 314 may be a digital financial wallet linked with the visitor user and may be used to pay for the charging of electric vehicles at charging locations. According to some embodiments, the system 102 may automatically debit the cost of charging a vehicle during a charging session from the wallet 314 and pay to an intended host user equipment. The one or more visitor user constraints 316 may include user defined preferences related to charging of the electric vehicle. For example, the one or more visitor user constraints 316 may include a time constraint defining the maximum waiting time at any charging station, another time constraint defining the maximum total time taken for a charging session, a requirement for waiting area at the charging station, and the like. The visitor mobility graph 318 of a visitor user may be a data representation of movement patterns of the visitor user defined with reference to a suitable timescale.

The vehicle data 320 may include one or more identifiers 322 of the electric vehicle associated with the visitor user and a plurality of electric vehicle constraints 324 such as battery specifications 326, charging specifications 328, and regulatory specifications 330. The battery specifications 326 may include battery type (Li-ion, Li-polymers, lead acid, nickel-hydrogen etc.), battery make, model, month and year of manufacture, lifespan of the battery, operating temperature range of the battery, power storage capacity of the battery, and the like. The charging specifications 328 of the battery may include charging requirements of the electric vehicle expressed in terms of charging voltage and rated current, charging cable or connector type of battery of the electric vehicle, and the like. The regulatory specifications 330 may include information such as local regulations, federal regulations, national regulations, insurance related regulations, and safety regulations associated with the vehicle and its operation and use. Additionally, the vehicle data 320 may also include vehicle specifications such as dimensions of the electric vehicle, unloaded weight of the electric vehicle, a brand of the electric vehicle, a model of the electric vehicle, and a year of manufacture of the electric vehicle.

FIG. 3B illustrates a block diagram showing a format of data stored in the host user database 116 utilized by the system 102 shown in FIG. 1, in accordance with one or more example embodiments. The host user database 116 may store host user data 350 for each host user associated with each charging station. The host user data 350 of a host user may include a host user identifier 352, a host user wallet 354, one or more host user constraints 356 associated with the host user, and a host mobility graph 358 of the host user.

Additionally, the host user data 350 may also include personal information of the host user. The host user identifier 352 may be provided or collected through a user interface of the host user equipment 114. The host user identifier 352 may be used by the system 102 to identify a host user. The host user wallet 354 may be a digital financial wallet linked with the host user and may be used to receive electronic credits or money for providing the corresponding charging station for charging of electric vehicles by visitor users. According to some embodiments, the system 102 may automatically debit the cost of charging a vehicle during a charging session from the wallet 314 of an intended visitor user and credit to the host user wallet 354 of the host user. The one or more host user constraints 356 may include user defined preferences related to use of the corresponding charging station for charging of the electric vehicle. For example, the one or more host user constraints 356 may include a time constraint defining the minimum waiting time at the charging station, another time constraint defining the minimum total time taken for a charging session, special considerations/instructions for using the charging station, and the like. The host mobility graph 358 of the host user may be a data representation of movement patterns of the host user defined with reference to a suitable timescale. For example, the mobility graph 358 of the host user may represent a predicted timeline of the host user in terms of mobility events, locations, and activities that are defined relative to time.

FIG. 3C illustrates a block diagram showing a format of data stored in the charging station (CS) database 112 utilized by the system 102 shown in FIG. 1, in accordance with one or more example embodiments. The charging station data 370 may include one or more identifiers 372 of a charging station associated with a host user and a plurality of charging station constraints 374 such as charging station specifications 376, charging specifications 378, and regulatory specifications 380. The charging station specifications 376 may include charger type (fast/normal), charger make, model, month and year of manufacture, operating temperature range of the charger, power supply capacity of the charger, maximum charging current, and the like. The charging specifications 378 of the charging station may include charging voltage and rated current, charging cable or connector type of available and compatible with the charging station, and the like. The regulatory specifications 380 may include information such as local regulations, federal regulations, national regulations, insurance related regulations, and safety regulations associated with the charging station and its operation and use.

Figure 4A:
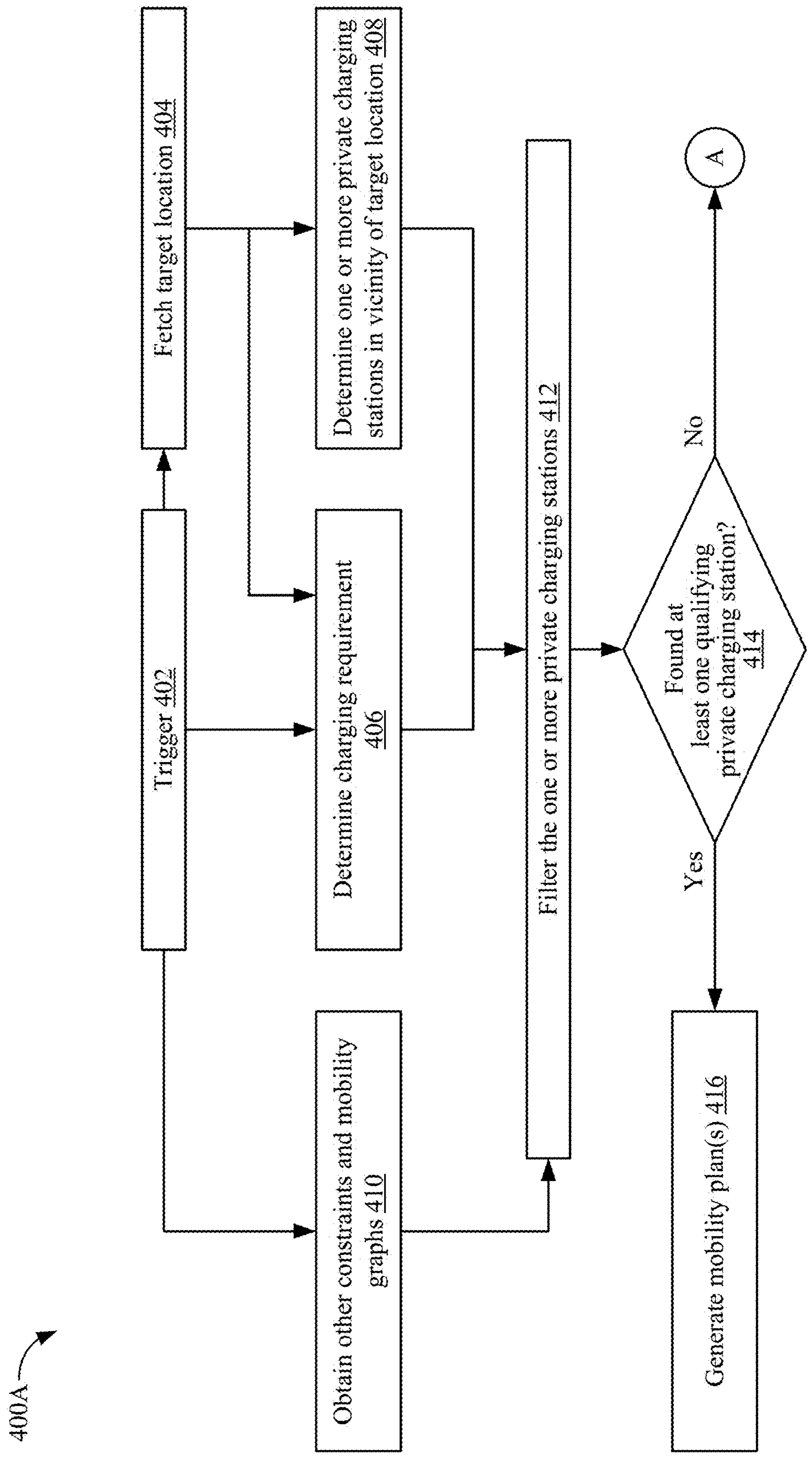

FIGS. 4A-4D jointly illustrate a flowchart of a method for mobility planning for automated charging of vehicles, in accordance with one or more example embodiments. FIGS. 4A-4D will be described in conjunction with FIGS. 5A-9 and with reference to FIGS. 1-3C. The flowchart 400A of FIG. 4A illustrates steps 402-414 which are described next. A trigger condition 402 or simply trigger that invokes the system 102 to execute the method for mobility planning for automated charging of vehicles is provided. According to some embodiments, the trigger 402 may be provided in a myriad of ways. For example, the trigger 402 may be provided as an input or request from a navigation service provider to the system 102 to determine one or more charging stations along a route between a source and a destination. In some other embodiments, the trigger 402 may be provided as an input or request from a visitor user equipment 106 to explore the possibility of charging an electric vehicle at a defined location such as a friend's house. Irrespective of the manner in which the system 102 is invoked, the trigger 402 may cause the system 102 to implement various data collection and processing steps which are described next.

As a part of the data collection steps, the system 102 may obtain other constraints and mobility graphs 410 and fetch one or more target locations 404. The system 102 may obtain the other constraints and mobility graphs 410 from the databases 108, 112, and 116 of FIG. 1 in any suitable way such as through direct query or indirectly through a corresponding user equipment. The system 102 may fetch the target location 404 corresponding to the trigger input 402. For example, the target location 404 may be provided by some program or application such as a navigation application or a personal assistant application. FIG. 5A illustrates an exemplary framework 500A for fetching target location(s) 404 from a navigation service provider 504, in accordance with one or more example embodiments. A visitor user may utilize a user equipment 502 to provide as an input, a source location in a source field 502A of the user equipment 502 and a destination location in a destination field 502B of the user equipment 502. The input may be provided to request from the navigation service provider 504 a route for reaching the destination location from the source location. The navigation service provider 504 may submit a route between the source and the destination to the system 102 for mobility planning. In this regard, the system 102 may receive locations defining the route between the source and destination locations. Each such location defining the route serves as a target location 404. In some embodiments, such locations on the route may have a regular or random distance between each consecutive pair.

In some alternate embodiments, the target location 404 may be fetched as an input from a visitor user via the corresponding visitor user equipment. FIG. 5B illustrates another exemplary framework for fetching target location(s) for mobility planning from a visitor user, in accordance with one or more example embodiments. A visitor user may utilize the user equipment 502 to provide as an input a target location in the input field 502C of the user equipment 502. The target location may be a location such as a friend's house or a library at which the visitor user may want to explore the possibility of charging an electric vehicle. The system 102 may fetch the target location 404 directly or indirectly from the user equipment 502.

Referring back to FIG. 4A, upon fetching the target location 404, the system 102 may invoke the charging data computation module 204B to determine charging requirement 406 for reaching the target location 404. FIG. 6 illustrates a flowchart showing some steps for determining charging data/requirement for mobility planning, in accordance with one or more example embodiments. In this regard, the system 102 may determine electrical energy requirement data of the vehicle for reaching the target location from a current location of the vehicle at step 602. Towards this end, the system 102 may calculate the route distance to the target location and approximate an amount of electrical power ($P_{travel}$) required for reaching the target location using mileage of the vehicle. Further, the system 102 may obtain 604 from the visitor user equipment 106, a current charge level of the battery of the vehicle and a final charge level desired at the target location. Accordingly, the system 102 computes the amount of electrical power currently available in the battery ($P_{reserve}$) from the current charge level. The system 102 also computes a final electrical power desired at the target location ($P_{target}$) from the desired final level of charge. The system 102 may determine 606 charging data for the vehicle based on the current charge level, the final charge level, and the electrical energy requirement data computed at 602. In this regard, the charging data for the vehicle may be determined from an amount of power required through charging ($P_{charging}$) of the vehicle which is given as:

$$P_{charging} = P_{travel} + P_{target} - P_{reserve}$$

If the amount of power required through charging ($P_{charging}$) is less than a defined percentage (for example 90%) of the total power storage capacity of the battery of the vehicle, the charging data may indicate a null value which indicates there is no requirement for intermediate charging of the vehicle during the commute to the target location. However, if the amount of power required through charging ($P_{charging}$) is more than the defined percentage of the total power storage capacity of the battery of the vehicle, the charging data may indicate a requirement of intermediate charging of the vehicle during the commute to the target location. The requirement for intermediate charging may be expressed in terms of full charging cycles as a ratio of the amount of power required through charging ($P_{charging}$) and the defined percentage of the total power storage capacity of the battery. For example, the requirement for intermediate charging may turn out to be 0.8 which indicates that the vehicle needs to be charged for 80% of a full charge cycle, where a full charge cycle indicates charging the battery from 0% to the defined percentage of the total power storage capacity of the battery.

Returning to FIG. 4A, the system also determines 408 one or more private charging stations in vicinity of the target location 404. FIG. 7 illustrates a flowchart showing some steps for determining private charging stations along a route for mobility planning, in accordance with one or more example embodiments. For each target location, the system 102 generates a query using a corresponding location identifier 702 of the target location and a threshold radius 704 within which the private charging stations are desired to exist. The query is submitted to the charging station database 706 (hereinafter, also referred to as CS database 706) and the system 102 retrieves 708 identifiers of one or more private charging stations (CS) falling within the threshold radius from each target location.

For each retrieved identifier, the system 102 utilizes the map data and imposes a connecting link criterion 710 on the associated CS to check if the CS has at least one connecting link to the target location in the map data. If the result of the check at 710 is yes, the system adds 712 the corresponding CS to a list of private CS falling along the route. However, if the result of the check at 719 is no, the system discards 714 the corresponding CS and proceeds to check 716 if all CS are evaluated. If the result of the check at 716 is no, the system selects 718 a next CS among the retrieved identifiers and repeats the evaluation from 710 to 716. However, if the result of the check at 716 is yes (indicating that all CS are evaluated), the system 102 proceeds to step 720. At 720, the system outputs a list of private CS if at least one CS exists in the list of private CS generated at 712 (indicating that one or more CS found in vicinity of the target location) otherwise the system 102 outputs an error message indicating that no CS found in the vicinity of the target location.

As described previously, as a part of the data collection steps for the method steps shown in FIG. 4A, the system 102 may obtain other constraints and mobility graphs 410. In this regard, the system 102 may obtain the visitor user constraints 316 and the electric vehicle constraints 324 from the visitor user database 108, for example, by interfacing directly with the database 108 or via the visitor user equipment 106. Similarly, the system 102 may obtain the host user constraints 356 from the host user database 116, for example, by interfacing directly with the database 116 or via the host user equipment 114. The system 102 may also obtain the charging station constraints 374 from the charging station database 112.

According to some embodiments, the system 102 may also obtain mobility graphs 318 and 358 of the visitor user and the host user, respectively. The mobility graph of a user may be a data representation of movement patterns of the user defined with reference to a suitable timescale. FIG. 8 shows an example of a mobility graph 800 utilized by the system 102 of FIG. 1, in accordance with one or more example embodiments. The mobility graph 800 comprises a plurality of movement patterns of a user (visitor or host, as the case may be) where each pattern may be a mobility event that is defined in terms of an event identifier (one among 802A . . . 802N), a mobility event description (one among 804A . . . 804N), a time of arrival $T_{arrival}$ (one among 806A . . . 806N) associated with the event, a geographical area identifier (one among 808A . . . 808N) associated with the event, a local zone identifier (one among 810A . . . 810N) associated with the event, and a time of arrival $T_{departure}$ (one among 812A . . . 812N) associated with the event. According to some embodiments, the mobility event may be defined in terms of fewer or more parameters than illustrated in FIG. 8. As an example, one entry of the mobility graph 800 may indicate that a user stays (mobility event description) at home (local zone) at Randolph Street (Geographical area) from 5:30 PM ($T_{arrival}$) on Aug. 25, 2024 till 8:00 AM ($T_{departure}$) on Aug. 26, 2024.

Returning to FIG. 4A, having obtained the constraints and mobility graphs at 410 and the charging requirement at 406, the system 102 implements filtering 412 of the one or more charging stations in vicinity of the target location based on the obtained constraints and the mobility graphs and the determined charging requirement. FIG. 9 illustrates a flowchart showing some steps for filtering 412 the private charging stations determined at FIG. 7 for mobility planning, in accordance with one or more example embodiments. The system 102 computes a relevance score of each private charging station (CS) that is provided as output at step 720 of FIG. 7. In this regard, the system 102 may compute the relevance score based on a threshold condition that defines acceptable levels of requirements of charging the vehicle. The threshold condition may be defined in terms of the constraints 316, 324, and 356 and the mobility graphs 318 and 358. As such, the computed relevance score indicates an extent to which a private CS satisfies the charging requirements, subject to the other constraints and conditions defined by the mobility graphs. According to some embodiments, the system 102 may assign different or same weights to each of the constraints and each of the conditions from the mobility graphs. In this regard, the system 102 may use a weighted correlation to determine a match between the constraints of the visitor and the constraints of the host user, a match score between the constraints of the vehicle and the constraints of the charging station, another match score between the constraints of the visitor and the constraints of the charging station, another match score between the constraints of the host user and the constraints of the vehicle, and so on. That is, each constraint or condition that has dependency or relation to another constraint or condition is evaluated and a score is assigned depending on an extent of the match. To compute the relevance score, a weighted average of all the match scores is taken.

The system 102 then evaluates each charging station among the private charging stations whose relevance score is computed at step 902 to determine which of the charging stations qualify in terms of feasibility and availability and which ones do not. Towards this end, the system 102 selects 904 a charging station and performs a check on the score of that charging score to ascertain 906 if the relevance score of the selected charging station is less than a threshold score. If the check at 906 returns a no, the selected charging station is added 908 to the list of qualifying charging stations. However, if the check at 906 returns a yes, the selected charging station is added 910 to the list of disqualified charging stations. In either case, the control of steps proceeds to step 912 where a check is run to determine if all private charging stations have been evaluated or not. If the check at 912 returns a no (i.e., there remain other charging stations that need to be evaluated), the system 102 selects 914 a next charging station and the steps 906-912 are repeated again. However, if the check at 912 returns a yes, the system 102 outputs 916 the list of qualifying and the list of disqualified charging stations.

Returning to FIG. 4A, based on the output of the filtering step 412, the system 102 determines 414 if at least one qualifying private charging station is found or not. If the check at 414 returns a yes (i.e., there exists at least one qualifying charging station), the system 102 proceeds to generate one or more mobility plans for the visitor user and/or the host user. Details of generating mobility plans is described later in this disclosure with reference to FIG. 10-12. However, if the check at 414 returns a no, the control of steps passes to the flowchart 400B of FIG. 4B.

Figure 4B:
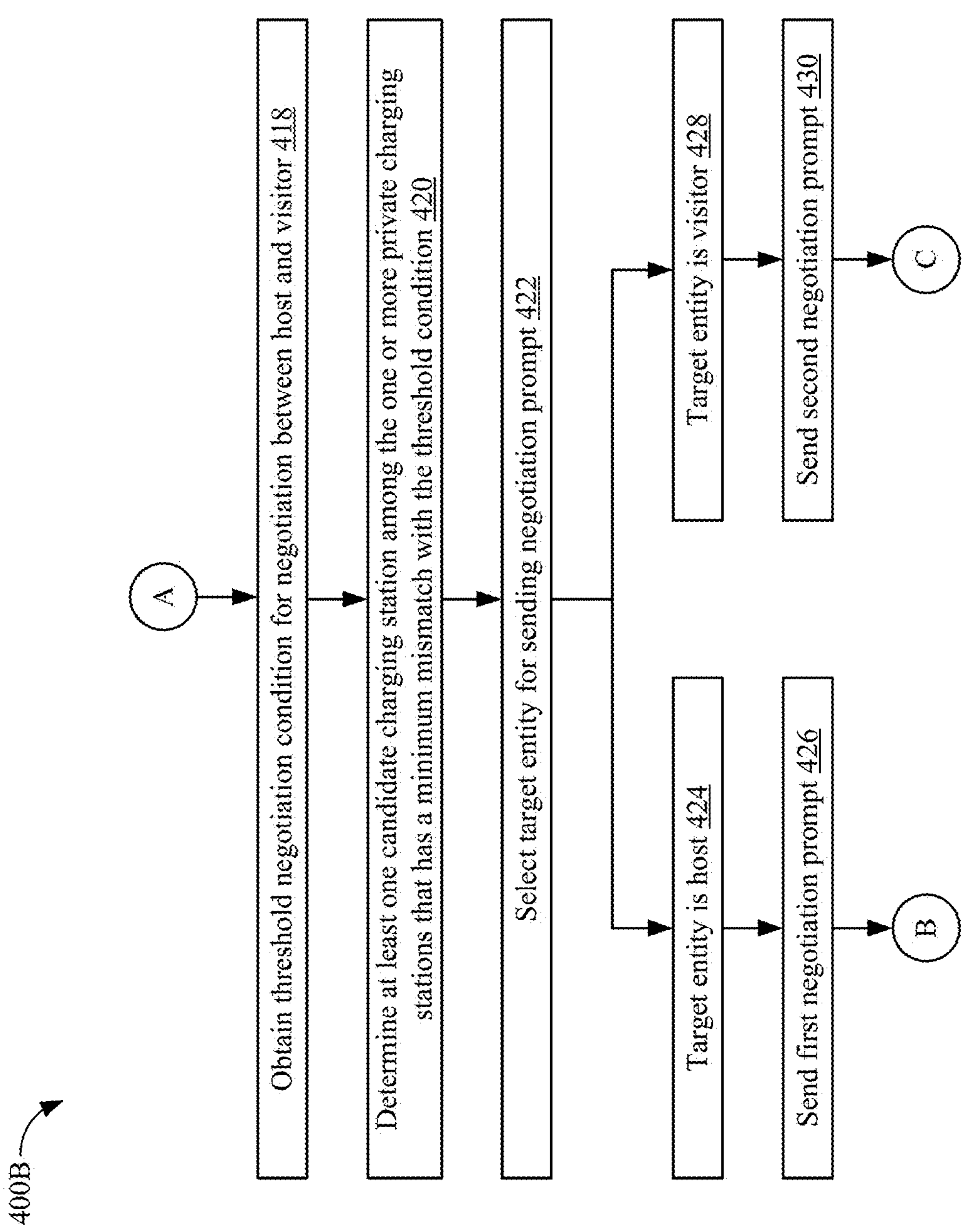

Referring to the flowchart of FIG. 4B, when no qualifying private charging station exists in the list of qualifying private charging stations, the system 102 obtains 418 a threshold negotiation condition for negotiation between the host user and the visitor user. The threshold negotiation condition may be determined in consultation with the host user and the visitor user. The threshold negotiation condition may list down the constraints and/or conditions among the constraints 316, 324, and 356 and the conditions of mobility graphs 318 and 358 that cannot be compromised with and must be satisfied to a certain extent.

The system 102 may accordingly, determine 420 at least one candidate charging station among the charging stations that are subject to filtering at 412, where the relevance score of the determined at least one candidate private charging station indicates a minimum mismatch to the threshold condition. The system 102 then selects 422 the target entity to which a negotiation prompt is to be sent from amongst the visitor user and the host user. In this regard, if the mobility planning is requested by the visitor user, the system 102 may select the host user as the target entity. In some other embodiments, the system 102 may randomly select the target entity from among the visitor user and the host user. If the selected target entity is determined 424 to be the host user, the system 102 sends a first negotiation prompt to the host user equipment 114 at the step 426. The first negotiation prompt may include a message request to modify a mobility plan of the host user or modify a host user constraint. However, if the selected target entity is determined 428 to be the visitor user, the system 102 sends a second negotiation prompt to the visitor user equipment 106 at the step 430. The second negotiation prompt may include a message request to modify a mobility plan of the visitor user or modify a visitor user constraint. For example, the visitor user may be asked to bring their own cable or reduce the charging time by 10% or the like. After sending the first negotiation prompt, the control of steps passes to the flowchart 400C of FIG. 4C while after sending the second negotiation prompt, the control of steps passes to the flowchart 400D of FIG. 4D.

Figure 4C:
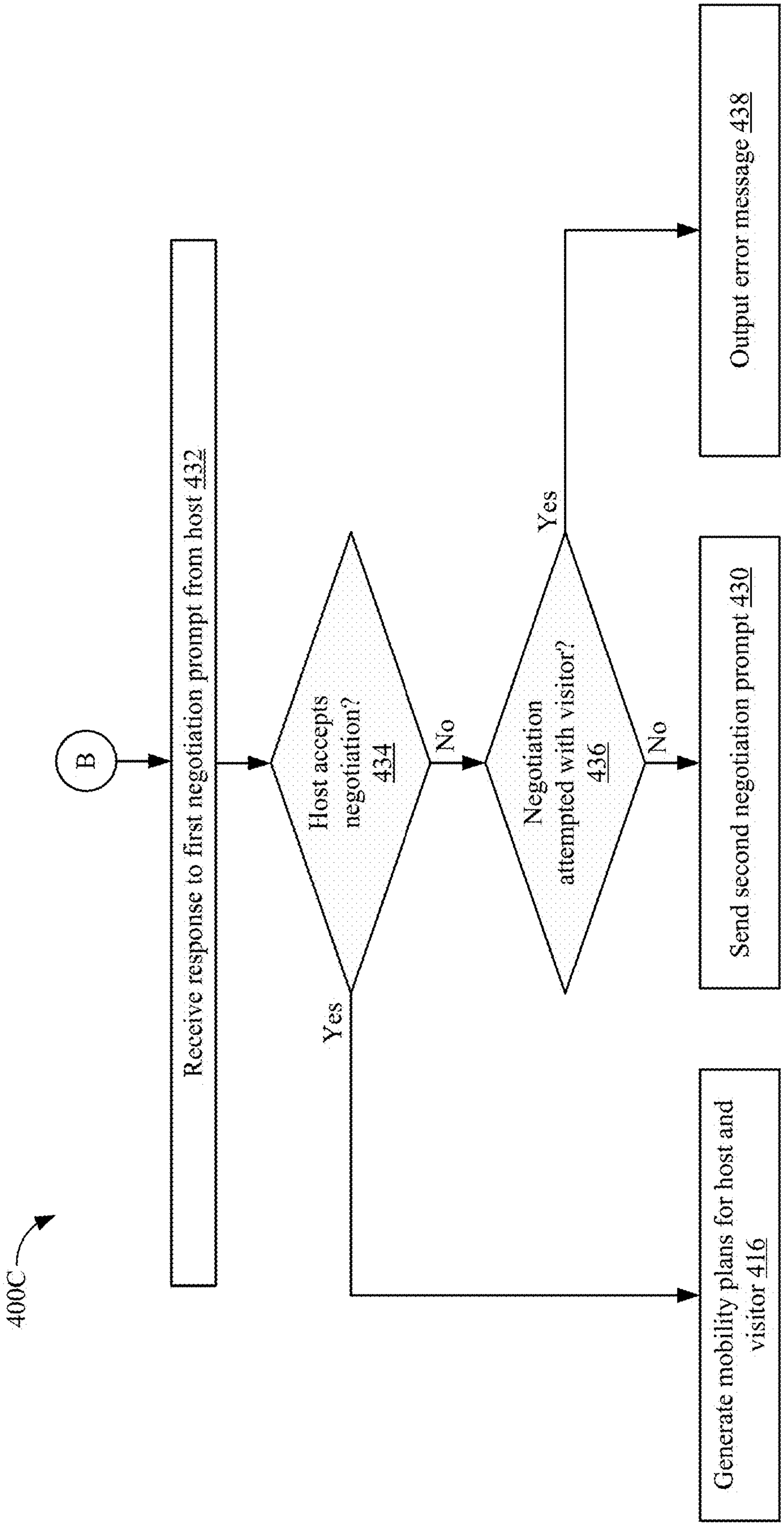

Referring to FIG. 4C, after sending the first negotiation prompt, the system 102 receives 432 a response to the first negotiation prompt from the host user equipment. The system 102 then processes the received response to determine 434 if the host user accepts the negotiation prompt or not. If the check at 434 returns a yes (i.e., the host user agrees to/accepts the negotiation), the system 102 proceeds to generate 416 the mobility plans for the host user and the visitor user. However, if the check at 434 returns a no, the system 102 proceeds to determine 436 if negotiation has already been attempted with visitor user.

If the check at 436 returns a yes, the system 102 outputs 438 an error message indicating that no suitable charging stations can be found and negotiation is not possible. However, if the check at 436 returns a no (i.e., the visitor user has not yet been offered a negotiation), the system 102 proceeds to send the second negotiation prompt to the visitor user equipment at the step 430 and thereafter the control of steps passes to the flowchart of FIG. 4D.

Figure 4D:
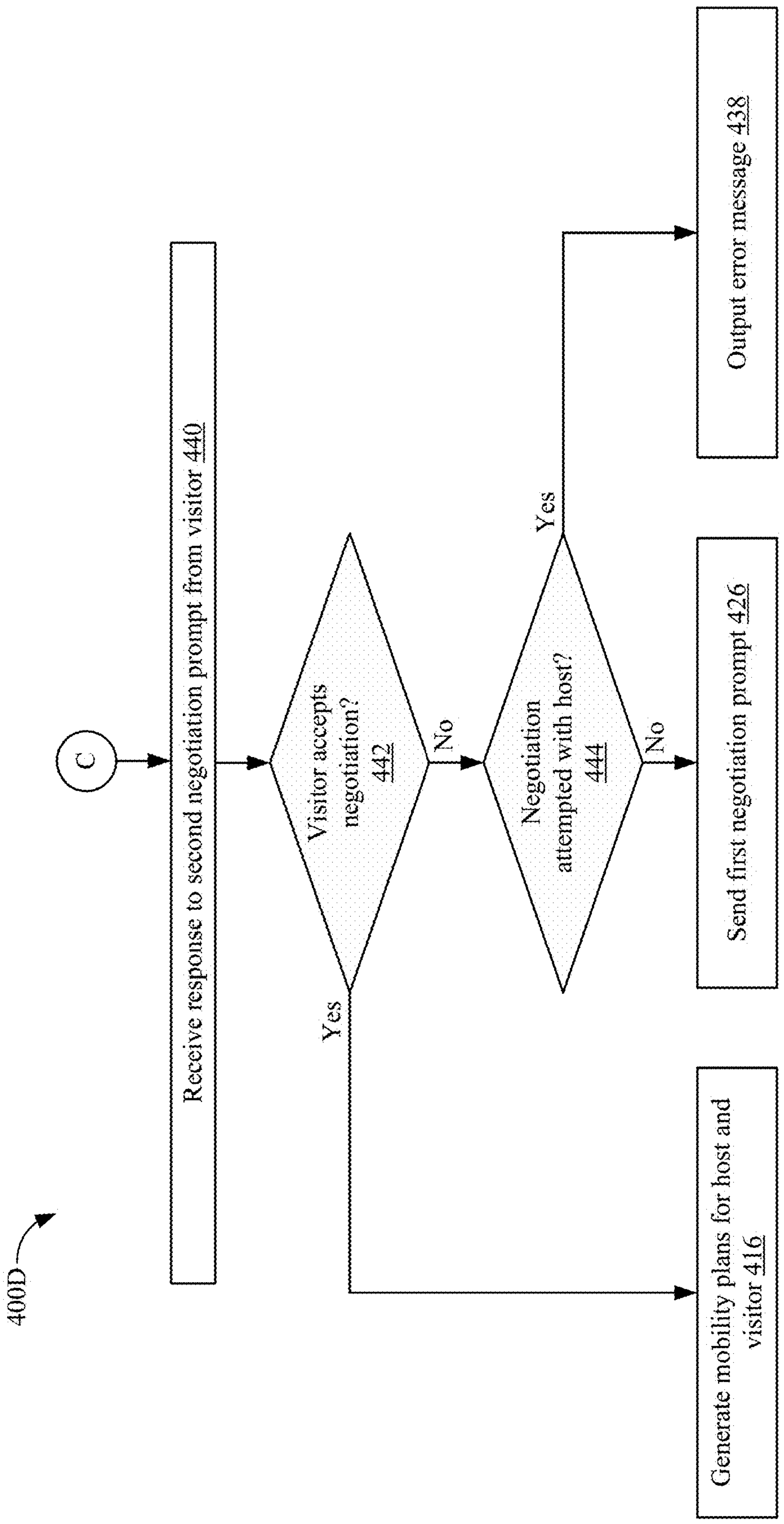

Referring to FIG. 4D, after sending the second negotiation prompt, the system 102 receives 440 a response to the second negotiation prompt from the visitor user equipment. The system 102 then processes the received response to determine 442 if the visitor user accepts the second negotiation prompt or not. If the check at 442 returns a yes (i.e., the visitor user agrees to/accepts the negotiation), the system 102 proceeds to generate 416 the mobility plans for the host user and the visitor user. However, if the check at 442 returns a no, the system 102 proceeds to determine 444 if negotiation has already been attempted with host user.

If the check at 444 returns a yes, the system 102 outputs 438 the error message indicating that no suitable charging stations can be found and negotiation is not possible. However, if the check at 444 returns a no (i.e., the host user has not yet been offered a negotiation), the system 102 proceeds to send the first negotiation prompt to the host user equipment at the step 426 and thereafter the control of steps passes to the flowchart of FIG. 4C and the sequence repeats until either the mobility plans for the host user and visitor user is generated at 416 or an error message is output at 438.

FIG. 10 illustrates a flowchart of a method 1000 for planning mobility of a vehicle, in accordance with one or more example embodiments. The method 1000 may be executed by a computing system such as the system 102 or the mapping platform 104 or a navigation system. A visitor user may utilize a user equipment (such as the user equipment 502 of FIG. 5A) to input a source location and a destination location. For example, the visitor user may want to drive to the destination location from a current location using an electrically powered vehicle. In this regard, the user may submit the inputs as a navigation request to a suitable system such as a navigation application running on a mobile device coupled to the vehicle. The navigation application may determine a first route between the source and the destination locations using map data accessible to the application at the step 1002. Thereafter, the navigation application may invoke the system 102 for mobility planning for the visitor/electric vehicle. In some embodiments, the user may submit the inputs as a navigation request to the system 102 that may be embodied as an application running on a mobile device coupled to the vehicle. In such embodiments, the system 102 may be invoked upon receipt of the input from the user and as such the system 102 may itself determine the first route using the map data at the step 1002.

Upon availability of the first route, the system 102 may evaluate the availability and feasibility of private charging station(s) along the first route at the step 1004. In this regard, the system 102 may execute the methods illustrated with reference to FIGS. 4A-4D. At step 1006, the system checks if at least one private charging station is found or not. If the check at 1006 returns a yes (indicating that a detour to the charging station may be required), the system 102 may modify 1008 the first route determined at 1002 to include stopover(s) to the at least one private charging station. The system 102 may then output 1010 the modified first route as a second route for navigating the visitor user's vehicle. However, if the check at 1006 returns a no (indicating no suitable charging station is found along the route that satisfies the charging requirement), the system 102 proceeds to output 1012 the first route for navigating the visitor user's vehicle. In this way, the system 102 may generate a mobility plan for the visitor user such that the visitor user is enabled to reach the destination location without encountering complete exhaustion of the battery power with the vehicle. Armed with such a system, electric vehicles can reach to greater ranges without dealing with uncertainty of finding available and compatible charging stations.

FIG. 11 illustrates an exemplary use case scenario 1100 for implementing the method 1000 of FIG. 10, in accordance with one or more example embodiments. A visitor may want to travel using an electric vehicle 1102 from a source location 1104 to a destination location 1106. The vehicle 1102 may communicate with the system 102 to request for navigation assistance. The system 102 may determine a first route 1108 in the manner described with reference to step 1002 of FIG. 10. Thereafter, the system 102 may compute charging data corresponding to the first route 1108. In some scenarios, the vehicle 1102 may have low charge, for example less than 25% of battery capacity, at the source location and therefore to traverse the first route, it may be determined that there is a requirement for intermediate charging of the vehicle 1102. The system 102 may execute the step 1004 of FIG. 10 to determine a private charging station 1110 that satisfies all the factors governing the charging of the vehicle 1102. Accordingly, the system 102 may modify the first route 1108 to include a detour to the charging station 1110 thereby generating the second route 1112. Thus, the vehicle 1102 can replenish its battery reserve at the charging station 1110 and continue the onward journey on the second route to reach the destination location 1106. In this way, embodiments of the present disclosure lead to increase in the operable range of the vehicle 1102.

In some embodiments, where no charging station falling along the first route 1108 satisfies the factors governing the charging of the vehicle 1102, the system 102 may invoke the steps illustrated in flowcharts 400B-400D of FIGS. 4B-4D to perform negotiation with the host user and/or the visitor user. FIG. 12 illustrates an exemplary use case scenario 1200 for a negotiation-based mobility planning of visitor users and host users for automated charging of vehicles, in accordance with one or more example embodiments. A visitor user equipment 1202 and a host user equipment 1204 may be communicatively coupled to the system 102 via the network 118. The system 102 may execute the steps of the flowcharts 400B-400D and perform negotiation between the visitor user equipment 1202 and the host user equipment 1204 in the manner described previously with respect to FIGS. 4B-4D. The first negotiation prompt may be transmitted at step 426 to the host user equipment 1204 while the second negotiation prompt may be transmitted at step 430 to the visitor user equipment 1202.

FIG. 13 illustrates a flowchart of a method 1300 for mobility planning for automated charging of electric vehicles, in accordance with one or more example embodiments. It will be understood that each block of the flow diagram of the method 1300 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by the memory 204 of the system 102, employing an embodiment of the present invention and executed by the processor 202. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram 1300 may support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions.

At block 1302, the method 1300 may include obtaining a first route between a source and a destination of a vehicle. For instance, the source and destination locations may be received as inputs via the visitor user equipment 106 and the system 102 may determine the first route using the map data stored in the mapping platform 104. Alternately, the system 102 may obtain the source and destination locations from a navigation application that computes the first route and provides the same to the system 102.

At block 1304, the method 1300 may include computing charging data for the vehicle based on the first route. For instance, in the manner described with reference to FIG. 6, the system 102 may obtain a current charge level of the battery of the vehicle at the source location and a final charge level desired at the destination location. The system 102 may compute the amount of electrical power currently available in the battery ($P_{reserve}$) from the current charge level. The system 102 may also compute a final electrical power desired at the destination location ($P_{target}$) from the desired final level of charge. The system 102 may then compute the charging data for the vehicle based on the current charge level, the final charge level, and the electrical energy requirement data computed for the first route in accordance with the step 602 of FIG. 6.

At block 1306, the method 1300 may include determining one or more private charging stations along the first route. Each private charging station of the one or more private charging stations may be associated with a respective host user. For instance, the system 102 may determines one or more private charging stations in vicinity of each location on the first route in accordance with the framework described with reference to FIG. 7. The system 102 may utilize the first route and the charging station database 112 in this regard.

At block 1308, the method 1300 may include obtaining one or more first constraints associated with each private charging station of the one or more private charging stations. For instance, the system 102 may fetch the one or more first constraints associated with each private charging station of the one or more private charging stations by querying the charging station database 112 and the host user database 116.

At block 1310, the method 1300 may include retrieving a host mobility graph of the host user of each private charging station of the one or more private charging stations. The host mobility graph of a host user defines mobility patterns of the corresponding host user on a first timescale. In various embodiments, the system 102 may fetch the host mobility graph from the host user database 116.

At block 1312, the method 1300 may include filtering the one or more private charging stations to obtain a result, based on the charging data for the vehicle, the one or more first constraints and the host mobility graph. In this regard, the system 102 may execute the steps illustrated in FIG. 9 and obtains a list of qualifying charging stations that includes private charging stations satisfying the factors governing the charging of the vehicle.

At block 1312, the method 1300 may include generating navigation recommendation data for the vehicle, based on the first route and the result. In an event where the list of qualifying charging stations is empty (result indicates a null value), the system 102 may generate the navigation recommendation data to include an error message and navigation instructions for traversing the first route. Alternately, when the list of qualifying charging stations includes at least one charging station, the system 102 may generate navigation instructions in accordance with a second route that includes a detour and stopovers for each such charging station in the list of qualifying charging stations.

Additionally, or alternatively, the method 1300 may include a step of outputting the navigation recommendation data. Additionally, or alternatively, the method 1300 may include a step of generating, using the navigation recommendation data, one or more navigation instructions for the vehicle to reach the destination via at least one charging station where the vehicle may be charged.

Therefore, in accordance with various embodiments of the present disclosure, the electric vehicle charging infrastructure may be utilized efficiently using the systems and methods described herein. The various example embodiments provide an improved charging infrastructure management approach that facilitates lower waiting times for charging of the vehicles, ensures compatibility between vehicles and the charging infrastructure, and enhances the driving range of electric vehicles by replacing hit and trial attempts for charging of the vehicles with a streamlined and directed charging schedule for charging of the vehicles. In essence, various example embodiments lead to better utilization of charging infrastructures while reducing the possibility of malfunctioning of such infrastructure due to incompatibility between the vehicles and infrastructure.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system, comprising:

a memory configured to store computer executable instructions; and one or more processors configured to execute the instructions to:

obtain a first route between a source and a destination of a vehicle;

compute charging data for the vehicle based on the first route;

determine one or more private charging stations along the first route, wherein each private charging station of the one or more private charging stations is associated with a respective host user;

obtain one or more first constraints associated with each private charging station of the one or more private charging stations;

retrieve a host mobility graph of the host user of each private charging station of the one or more private charging stations, wherein the host mobility graph of a corresponding host user defines mobility patterns of the corresponding host user on a first timescale;

filter the one or more private charging stations to obtain a result, based on the charging data for the vehicle, the one or more first constraints and the host mobility graph, wherein to filter the one or more private charging stations, the one or more processors are configured to:

compute a relevance score of each private charging station of the one or more private charging stations, based on a threshold condition, wherein the threshold condition defines acceptable levels of requirements of charging the vehicle, and wherein the relevance score of a private charging station of the one or more private charging stations indicates an extent to which the private charging station satisfies the requirements of charging the vehicle; and output the result, based on the computed relevance score of each private charging station of the one or more private charging stations;

generate at least one second route between the source and the destination, based on the first route and the result; and output the at least one second route.

2. The system of claim 1, wherein the charging data indicates a requirement for an intermediate charging of the vehicle along the first route and the result mismatches the requirement for intermediate charging of the vehicle along the first route, and wherein the one or more processors are further configured to:

determine at least one candidate private charging station among the one or more private charging stations, wherein the relevance score of the determined at least one candidate private charging station indicates a minimum mismatch to the threshold condition.

3. The system of claim 2, wherein the one or more processors are further configured to transmit a first negotiation prompt to a first user device associated with a respective host user of the at least one candidate private charging station, and wherein the first negotiation prompt includes a message request to modify a mobility plan of the respective host user of the at least one candidate private charging station.

4. The system of claim 2, wherein the one or more processors are further configured to transmit a second negotiation prompt to a second under device associated with at least one occupant of the vehicle, wherein the second negotiation prompt includes a message request to modify a mobility plan of the at least one occupant of the vehicle.

5. The system of claim 1, wherein the one or more first constraints associated with each private charging station of the one or more private charging stations comprises at least one of: one or more of operational constraints of a respective private charging station of the one or more private charging stations or regulatory constraints of the respective private charging station of the one or more private charging stations.

6. The system of claim 1, wherein the one or more processors are further configured to:

determine availability data of each private charging station of the one or more private charging stations, based on the host mobility graph of a respective host user of each private charging station of the one or more private charging stations; and filter the one or more private charging stations, based on the availability data of each private charging station of the one or more private charging stations.

7. The system of claim 1, wherein the one or more processors are further configured to obtain one or more second constraints associated with at least one occupant of the vehicle, wherein the one or more second constraints are associated with one or more operational parameters of the vehicle.

8. The system of claim 7, wherein the one or more processors are further configured to:

compute, for each private charging station of the one or more private charging stations, a match score between the one or more first constraints and the one or more second constraints; and filter the one or more private charging stations based on the match score of each private charging station of the one or more private charging stations.

9. The system of claim 1, wherein the one or more processors are further configured to:

retrieve a visitor mobility graph of at least one occupant of the vehicle, wherein the visitor mobility graph of a corresponding occupant of the vehicle defines mobility patterns of the corresponding occupant on a second time scale; and filter the one or more private charging stations based on the visitor mobility graph of the one or more occupants of the vehicle.

10. The system of claim 1, wherein to filter the one or more private charging stations, the one or more processors are further configured to assign a weight to each constraint of the one or more first constraints.

11. The system of claim 1, wherein the result is a null value, and wherein the one or more processors is configured to generate the at least one second route as the first route.

12. The system of claim 1, wherein the result comprises one or more filtered private charging stations, and wherein to generate the at least one second route, the one or more processors are configured to modify the first route to include one or more stopovers to the one or more filtered private charging stations.

13. The system of claim 1, wherein to compute the charging data for the vehicle, the one or more processors are further configured to:

determine electrical energy requirement data of the vehicle for reaching the destination based on the first route;

obtain a current charge level of the vehicle and a final charge level of the vehicle; and determine the charging data for the vehicle based on the current charge level, the final charge level, and the electrical energy requirement data.

14. The system of claim 1, wherein the vehicle is an autonomous vehicle, and wherein the one or more processors are further configured to generate control commands for maneuvering the autonomous vehicle based on the generated at least one second route.

15. A computer-implemented method, comprising:

obtaining a first route between a source and a destination of a vehicle;

computing charging data for the vehicle based on the first route;

determining one or more private charging stations along the first route, wherein each private charging station of the one or more private charging stations is associated with a respective host user;

obtaining one or more first constraints associated with each private charging station of the one or more private charging stations;

obtaining one or more second constraints associated with at least one occupant of the vehicle, wherein the one or more second constraints are associated with one or more operational parameters of the vehicle;

retrieving a host mobility graph of the host user of each private charging station of the one or more private charging stations, wherein the host mobility graph of a corresponding host user defines mobility patterns of the corresponding host user on a first timescale;

computing, for each private charging station of the one or more private charging stations, a match score between the one or more first constraints and the one or more second constraints;

filtering the one or more private charging stations to obtain a result, based on the match score of each private charging station of the one or more private charging stations, the charging data for the vehicle, the one or more first constraints and the host mobility graph;

generating navigation recommendation data for the vehicle, based on the first route and the result; and outputting the navigation recommendation data.

16. The computer-implemented method of claim 15, wherein the navigation recommendation data for the vehicle comprises one or more of at least one second route between the source and the destination generated based on the first route and the result or a message prompt indicating feasibility of the at least one second route.

17. The computer-implemented method of claim 15, further comprising:

determining availability data of each private charging station of the one or more private charging stations based on the host mobility graph of a respective host user of the one or more private charging stations; and filtering the one or more private charging stations based on the corresponding availability data of each private charging station of the one or more private charging stations.

18. The computer-implemented method of claim 15, wherein filtering the one or more private charging stations further comprises assigning weights to the one or more first constraints.

19. The computer-implemented method of claim 15, further comprising modifying the first route to include one or more stopovers to one or more filtered private charging stations, included in the result, to generate the at least one second route.

20. A non-transitory computer readable storage medium including one or more sequences of one or more instructions which, when executed by one or more processors, cause the one or more processors to at least perform:

obtaining a first route between a source and a destination of a vehicle;

computing charging data for the vehicle based on the first route;

determining one or more private charging stations along the first route, wherein each private charging station of the one or more private charging stations is associated with a respective host user;

obtaining one or more first constraints associated with each private charging station of the one or more private charging stations;

retrieving a host mobility graph of the host user of each private charging station of the one or more private charging stations, wherein the host mobility graph of a corresponding host user defines mobility patterns of the corresponding host user on a first timescale;

filtering the one or more private charging stations to obtain a result, based on the charging data for the vehicle, the one or more first constraints and the host mobility graph, wherein the result comprises one or more filtered private charging stations;

modifying the first route to include one or more stopovers to the one or more filtered private charging stations to generating at least one second route between the source and the destination, based on the first route and the result; and outputting the at least one second route.

* * * * *